(12) United States Patent
Lample et al.

(10) Patent No.: US 9,792,896 B2
(45) Date of Patent: Oct. 17, 2017

(54) PROVIDING INTELLIGENT TRANSCRIPTIONS OF SOUND MESSAGES IN A MESSAGING APPLICATION

(71) Applicant: Facebook, Inc., Menlo Park, CA (US)

(72) Inventors: Guillaume Lample, Brest (FR); Arnaud Vincent Albalat, Marseillan (FR)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/969,274

(22) Filed: Dec. 15, 2015

(65) Prior Publication Data

US 2017/0169812 A1 Jun. 15, 2017

(51) Int. Cl.
*G10L 15/00* (2013.01)
*G10L 15/01* (2013.01)
*G10L 15/16* (2006.01)
*G10L 25/09* (2013.01)
*G06F 17/27* (2006.01)

(52) U.S. Cl.
CPC .......... *G10L 15/01* (2013.01); *G06F 17/2765* (2013.01); *G10L 15/16* (2013.01); *G10L 25/09* (2013.01)

(58) Field of Classification Search
CPC .................................................. G06F 17/2765
See application file for complete search history.

(56) References Cited

U.S. PATENT DOCUMENTS

| 5,956,463 | A | * | 9/1999 | Patrick | G10L 15/16 119/906 |
|---|---|---|---|---|---|
| 2010/0145698 | A1 | * | 6/2010 | Chen | G09B 7/02 704/256.1 |
| 2014/0372835 | A1 | * | 12/2014 | Kwon | H04L 1/0045 714/776 |
| 2015/0039299 | A1 | * | 2/2015 | Weinstein | G10L 15/16 704/202 |
| 2015/0312175 | A1 | * | 10/2015 | Langholz | H04L 51/04 715/716 |
| 2016/0111090 | A1 | * | 4/2016 | Holdren | G10L 15/22 704/251 |

* cited by examiner

*Primary Examiner* — Qian Yang
(74) *Attorney, Agent, or Firm* — Keller Jolley Preece

(57) ABSTRACT

One or more embodiments described herein include methods and systems of creating transcribed electronic communications based on sound inputs. More specifically, systems and methods described herein provide users the ability to easily and effectively send an electronic communication that includes a textual message transcribed from a sound input. Additionally, systems and methods described herein provide an analysis of a textual message transcribed from a sound input allowing users to correct an inaccurate or incorrect transcription.

20 Claims, 12 Drawing Sheets

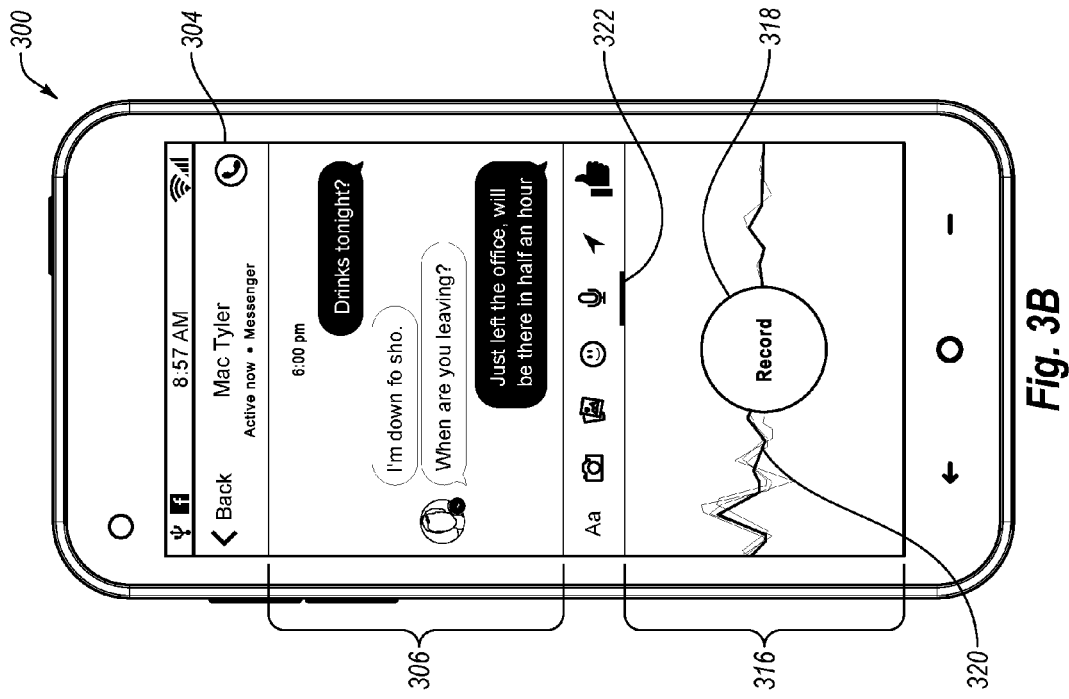
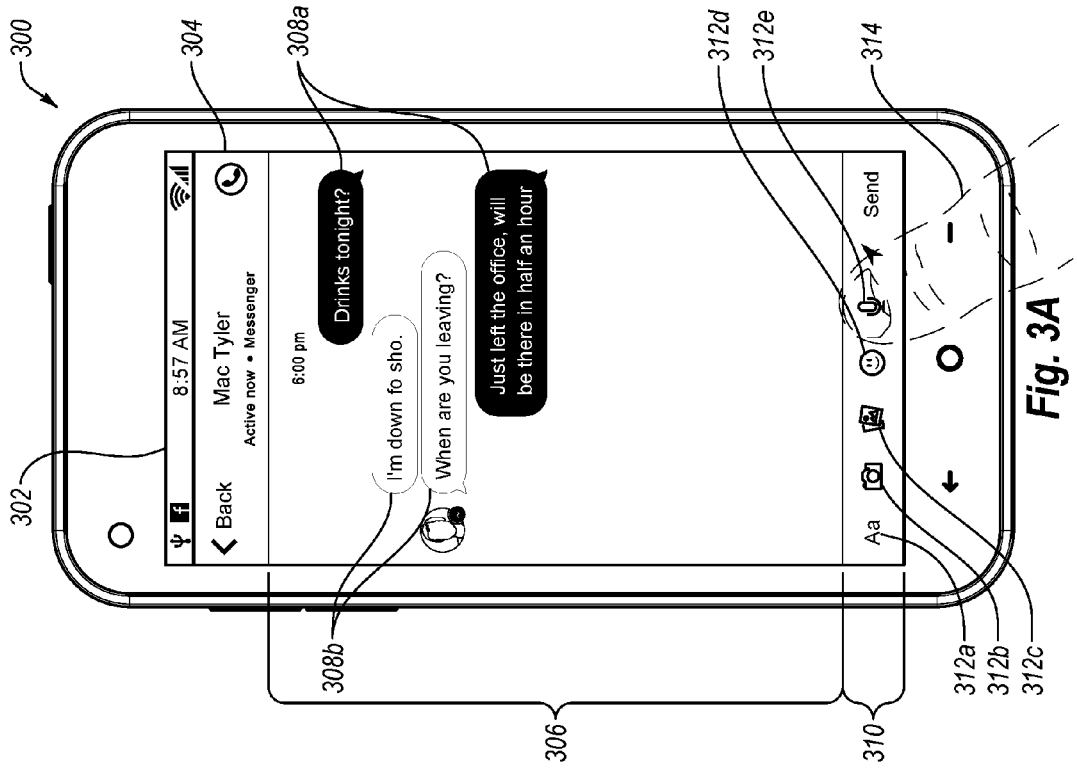

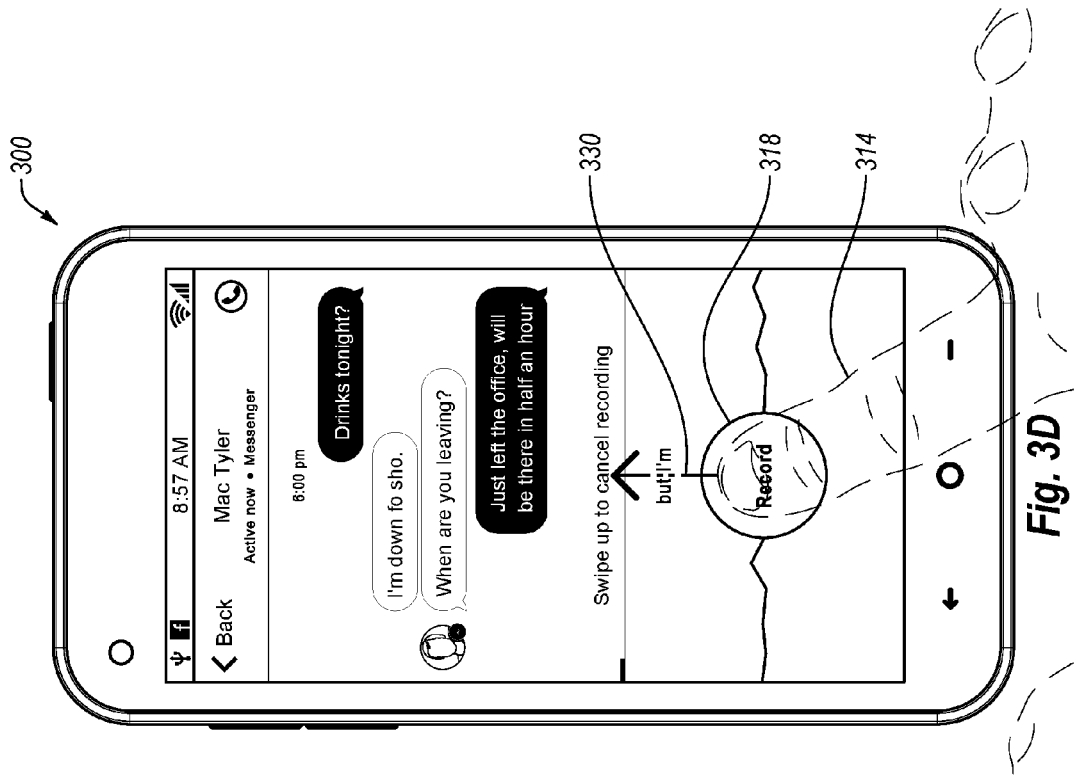
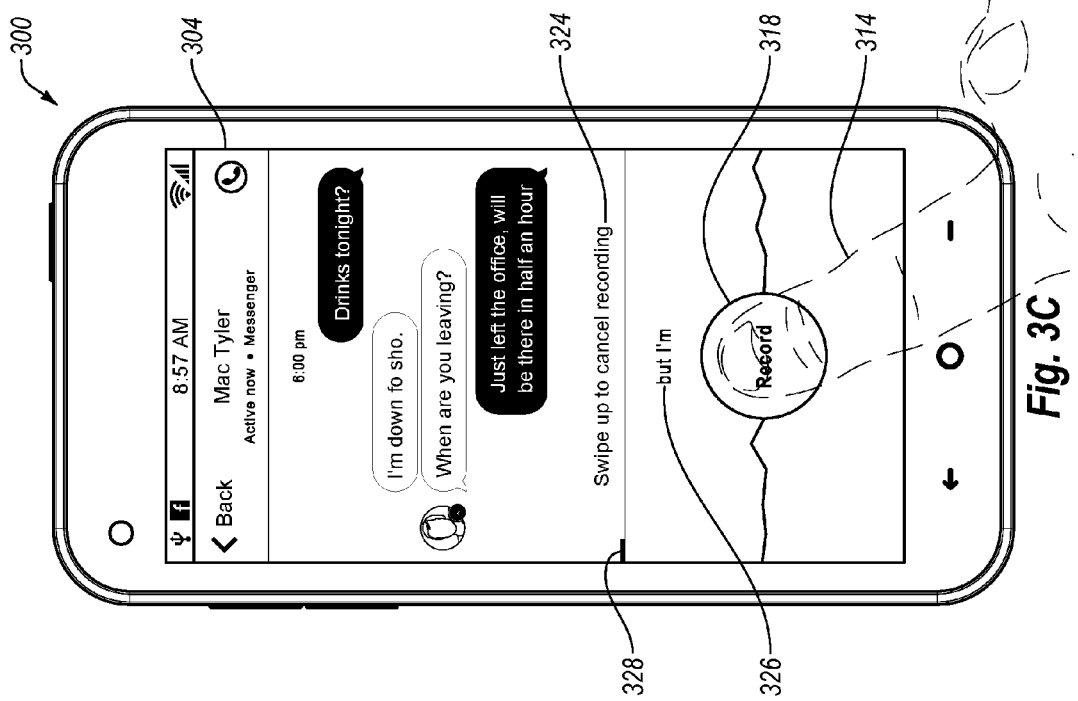
Fig. 3C
Fig. 3D

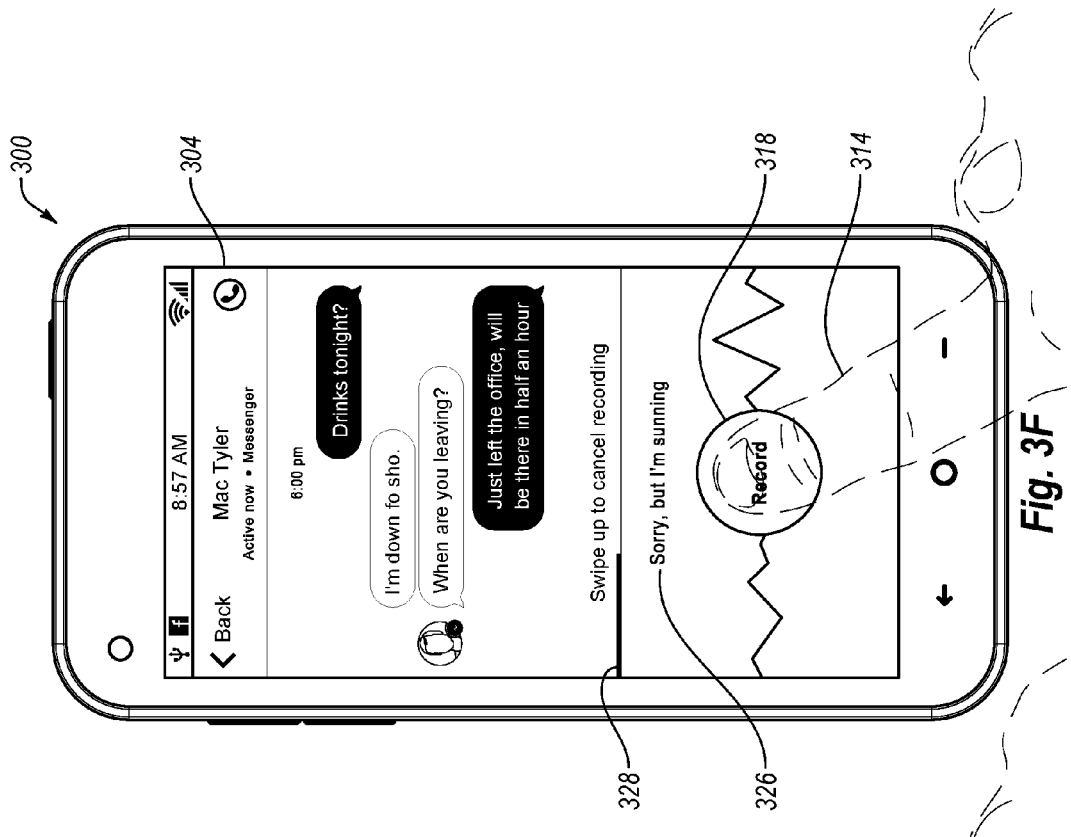
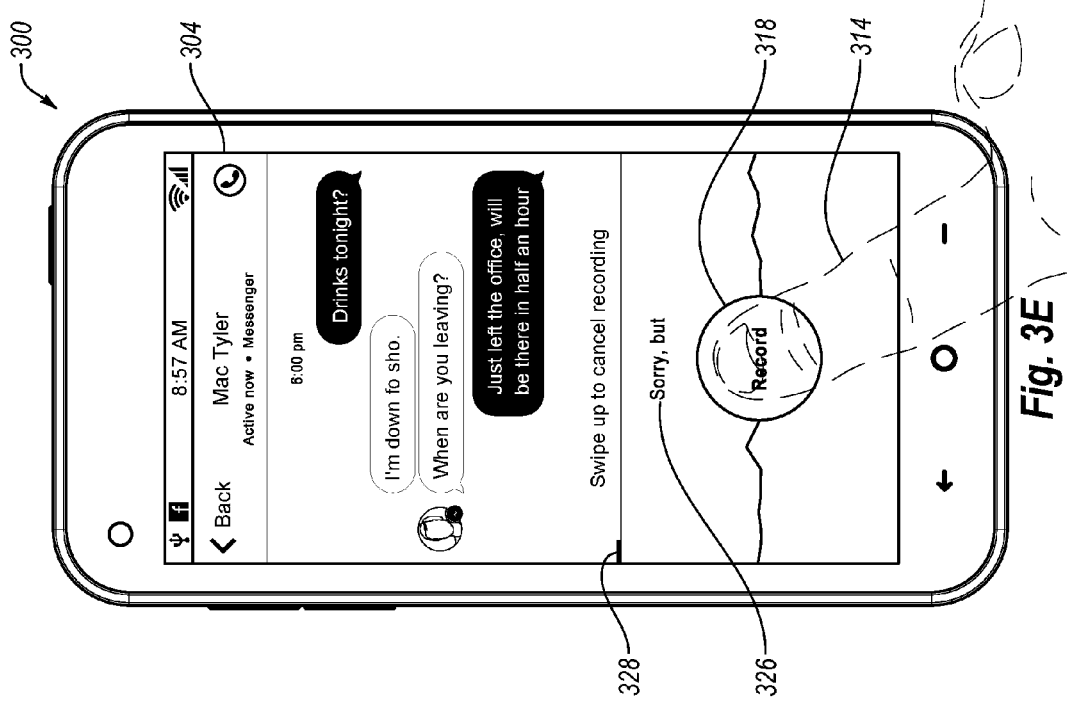

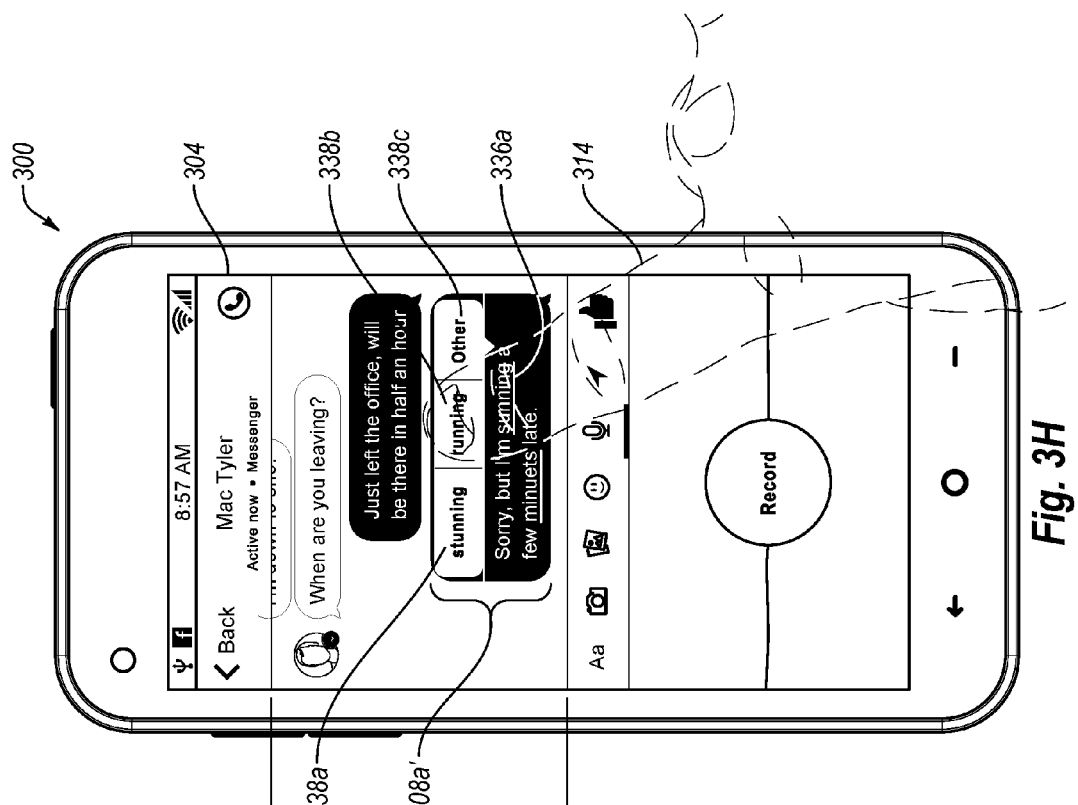
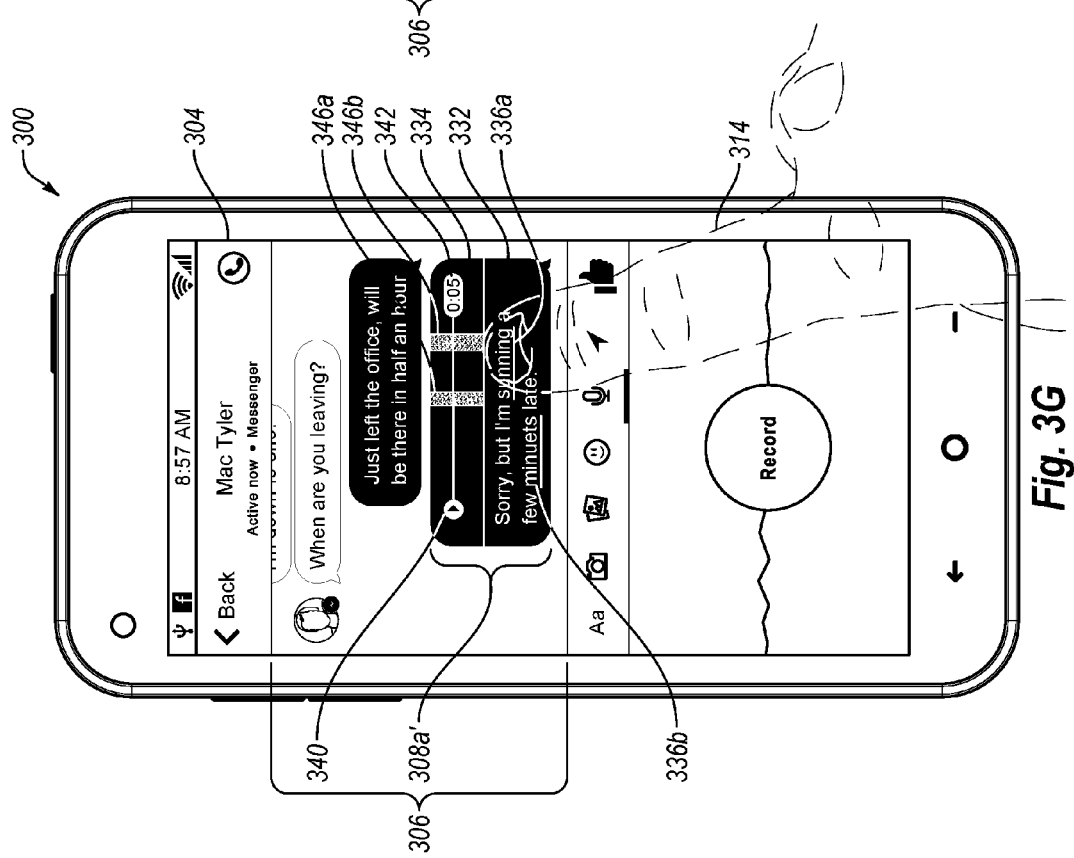
Fig. 3G
Fig. 3H

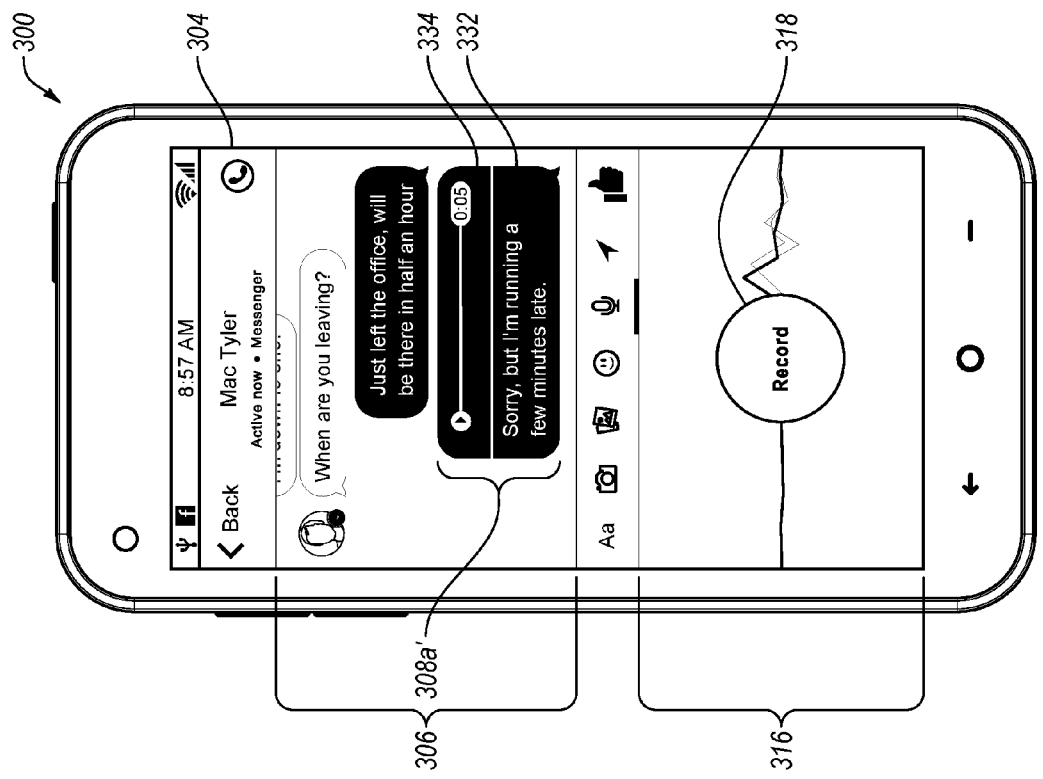
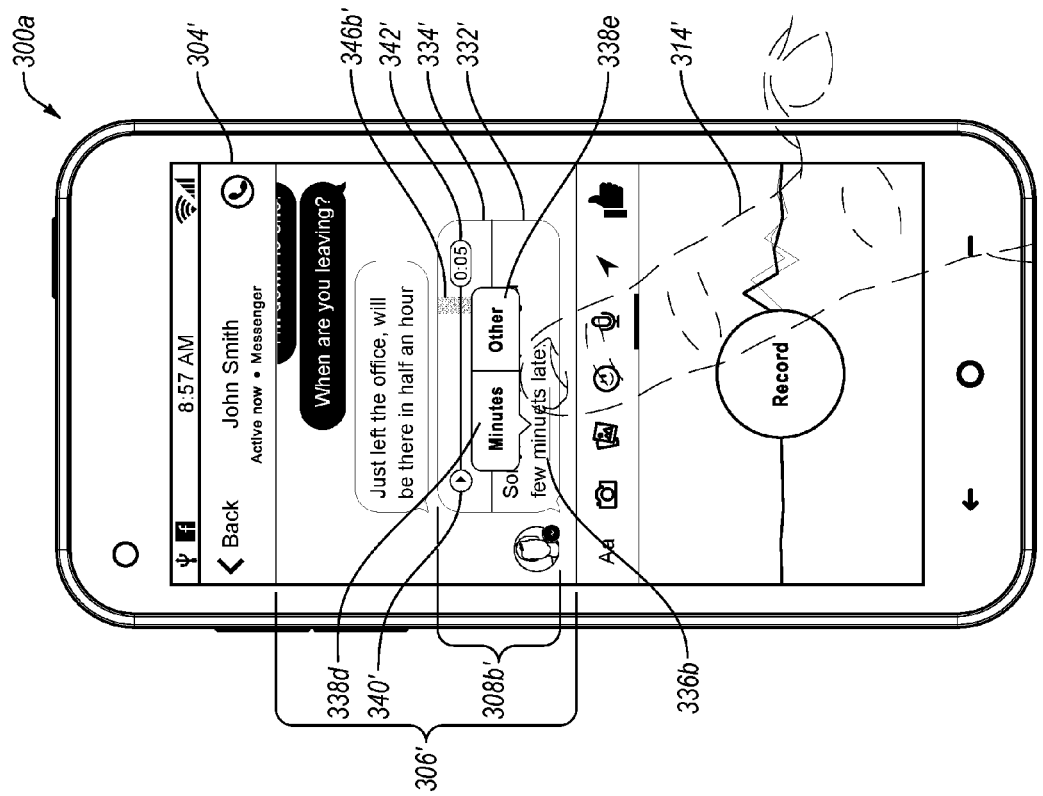

PROVIDING INTELLIGENT TRANSCRIPTIONS OF SOUND MESSAGES IN A MESSAGING APPLICATION

BACKGROUND

1. Technical Field

One or more embodiments relate generally to electronic communication systems and methods. More specifically, one or more embodiments relate to systems and methods for increasing functionality in an electronic communication system.

2. Background and Relevant Art

Computing devices (e.g., computers, tablets, and smart phones) provide numerous ways for people to connect and communicate with one another. For example, a variety of electronic communication systems provide various methods to send and receive electronic messages. For instance, a computing device can allow a user to communicate with other users using text messaging, instant messaging, social network posting, and other forms of electronic communication. In addition, an electronic communication may include a variety of content including text, images, video, audio, and/or other data. In general, electronic communication has become a popular way for people to connect and communicate with one another.

The popularity and ubiquitous nature of handheld devices (e.g., mobile phones) enable a user to engage in electronic communications throughout the day, regardless of the user's situation. For example, a person may engage in an electronic communication while at home, at work, at the grocery store, or while in any number of other situations. As such, a person's attention is frequently turned to a personal computing device while the person is typing out an electronic message.

Problems generally arise when a user's attention is frequently consumed by electronic communications. For example, typing electronic communications while driving is extremely dangerous and often leads to serious road accidents and traffic violations. Similarly, attempting to type an electronic communication while cooking, working, tending children, or any other activity that requires a person's full attention can lead to less than desirable results.

For this purpose, computing devices typically feature software capable of transcribing spoken words into text, thus freeing the user from the need to type electronic messages out. These "talk-to-text" programs are often problematic. For example, talk-to-text programs typically do not provide accurate transcriptions. Frequently, a user may speak a sentence only to receive a transcription full of incorrect words that make no sense together. Thus, a user generally may have to go back through the transcription to manually correct mistakes, negating the purpose of using talk-to-text in the first place.

Additionally, talk-to-text programs generally do not provide transcriptions for vocal cues, such as tonal inflexion or sarcasm. For example, a user may speak the sentence, "That's a great idea," meaning to provide a sarcastic response to an electronic communication. A typical talk-to-text program would include no indicator of the intended sarcasm in the resulting transcription.

In some cases, a talk-to-text program may include the ability to calculate a confidence score associated with a talk-to-text transcription. A confidence score generally indicates the likelihood of the transcription of a word being correct. If the confidence score associated with a transcription is below a defined threshold, for example, the talk-to-text program can typically determine that the transcription is not correct.

Typical confidence scores, however, are problematic in that a typical confidence score is merely based on a signal analysis of a phoneme, word, phrase, or sentence. Thus, a typical confidence score fails to take into account many relevant factors. For example, many typical confidence score calculation methods fail to account for a word's context, or in other words, how one word fits into a group of words in a sentence. Accordingly, the resulting confidence score from many typical confidence score calculation methods provide misleading or false results.

Thus, there are several disadvantages to current methods for providing transcriptions in a messaging application.

SUMMARY

One or more embodiments provide benefits and/or solve one or more of the foregoing and other problems in the art with methods and systems that provide enhanced features for electronic communication systems. For example, methods and systems described herein allow users greater functionality in using talk-to-text features via an electronic communication system. Furthermore, one or more embodiments can provide the foregoing or other benefits easily and intuitively through a user interface of the electronic communication system.

In particular, systems and methods of one or more embodiments allow for greater understanding in talk-to-text transcriptions. For example, in one or more embodiments, a sound recording is provided in addition to a transcription of the sound recording. Thus, a user can optionally read a message, listen to a message, or listen and read a message. As such, one or more embodiments allow a user to listen to the recording to clear up any lack of clarity regarding the non-literal meaning of the transcription.

Furthermore, systems and methods of one or more embodiments provide greater accuracy in talk-to-text transcriptions. For example, in one or more embodiments, an analysis determines a level of confidence regarding whether or not the transcription is accurate. In one or more embodiments, interactive tools assist a sender, a recipient, or both in editing low-confidence level portions of a talk-to-text transcription.

Additionally, systems and methods of one or more embodiments calculate an accurate confidence score associated with a talk-to-text transcription. For example, in one or more embodiments, systems and methods train a neural network to accurately determine whether a word transcription is correct based on the word's context. In at least one embodiment, the neural network includes input nodes associated with a variety of features to provide an accurate confidence output, which leads to accurate identifications of incorrect words, combinations of words, or sentences in talk-to-text transcriptions.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIGS. 3A-3K illustrate user interfaces for creating and sending a sound recording in accordance with one or more embodiments;

DETAILED DESCRIPTION

Figure 1:
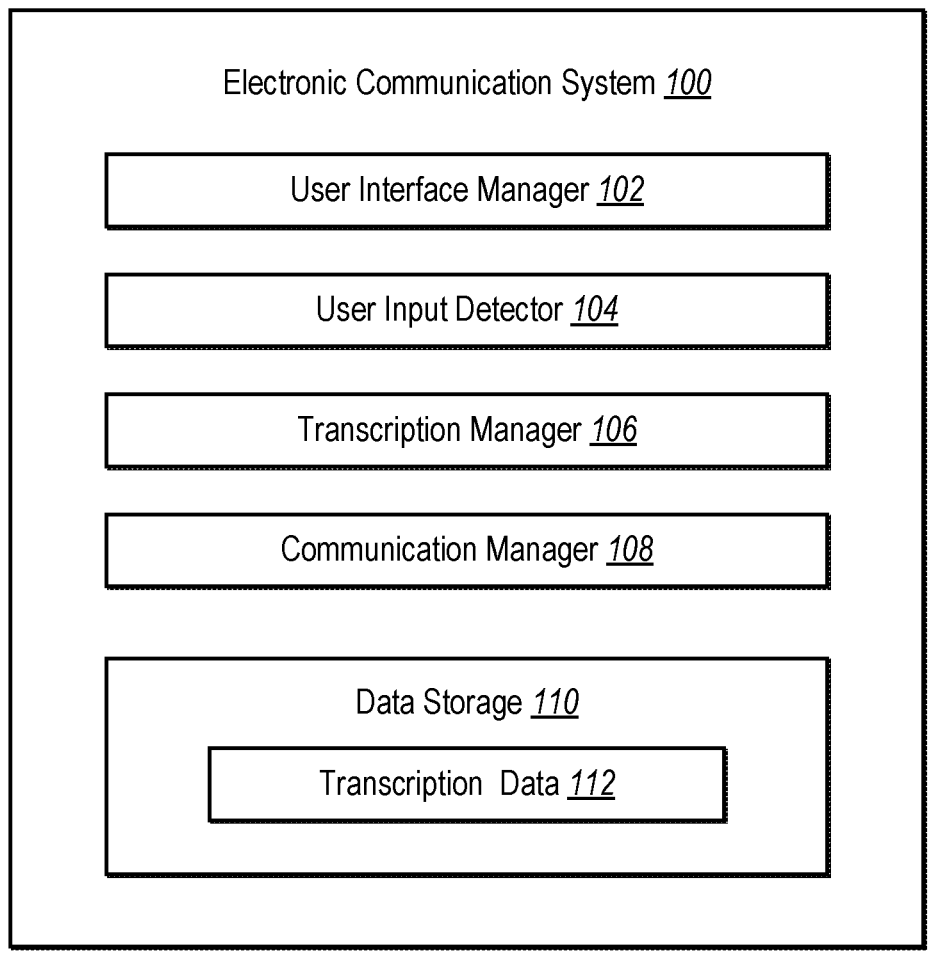
FIG. 1 illustrates a schematic diagram of an electronic communication system in accordance with one or more embodiments.

One or more embodiments of the present invention include an electronic communication system that provides users with efficient and effective user experiences when sending electronic communications based on sound recordings. More specifically, one or more embodiments described herein allow users to easily and intuitively record a message and send an electronic message based on the recording. In particular, the electronic communication system described herein can allow create a textual transcription of a recording. For example, one or more embodiments record a message and send an electronic communication to a co-user including a transcription of the recording.

Furthermore, the electronic communication system can provide a greater understanding of electronic communications based on recordings. For instance, one or more embodiments send the sound recording to one or more co-users in addition to the transcription. Thus, in a particular embodiment, a co-user may read the transcription of the message as well as listen to the recording of the message.

One or more embodiments automatically add the captured sound recording to the communication thread and send the sound recording as an electronic message immediately upon completion of the user interaction used to capture the multimedia. In other words, the electronic communication system can capture a sound recording, send the sound recording as an electronic message, and add the sound recording to a communication thread for playback all in response to a single user gesture. Thus, one or more embodiments can foster spontaneous, speedy, unrehearsed or edited communication.

Additionally, the electronic communication system greater accuracy in recording-based transcriptions. For example, one or more embodiments described herein provide an analysis of a transcription based on a recording in order to determine a level of confidence regarding whether or not the transcription is accurate. In a particular embodiment, an analysis of a transcription may indicate low confidence in at least one word in a transcription that is likely misspelled, grammatically incorrect, or contextually incorrect. One or more embodiments also suggest alternatives to words for which an analysis indicates low confidence or otherwise allow a user to correct a portion of a transcription with a low confidence score. At least one embodiment can calculate a confidence score by utilizing a neural network.

To aid in the correction of a portion of a transcription with a low level of confidence, the electronic communication system can determine which portion of the recording corresponds to the portion of the transcription with a low confidence score. Upon a user selection of the portion of the transcription with a low confidence score, the electronic communication system can play a corresponding portion of the recording. Listening to the portion of the recording can allow the user to determine the meaning of the portion of the transcription with the low confidence score.

In addition to the foregoing, the electronic communication system can allow either the sender or the recipient to correct a portion of a transcription with a low confidence score. For example, if the sender corrects the transcription, the electronic communication system can reflect the correction in transcription sent to the recipient. Similarly, if the recipient corrects the transcription, the electronic communication system can reflect the correction in the sender's transcription.

FIG. 1 illustrates an example embodiment of an electronic communication system 100. As shown, the electronic communication system 100 may include, but is not limited to, a user interface manager 102 (or simply "UI manager"), a user input detector 104, a transcription manager 106, a communication manager 108, and a data storage 110. Each of the components 102-110 of the electronic communication system 100 may be in communication with one another using any suitable communication technologies. Although the disclosure herein shows the components 102-110 to be separate in FIG. 1, any of the components 102-110 may be combined into fewer components, such as into a single facility or module, or divided into more components as may serve a particular embodiment. In addition, the components 102-110 may be located on, or implemented by, one or more computing devices, such as those described below in relation to FIG. 6. Alternatively, portions of the electronic communication system 100 can be located on a computing device, while other portions of the electronic communication system 100 are located on, or form part of, a social networking system, such as that described below in reference to FIG. 7.

The components 102-110 can comprise software, hardware, or both. For example, the components 102-110 can comprise one or more instructions stored on a computer readable storage medium and executable by a processor of one or more computing devices. When executed by the one or more processors, the computer-executable instructions of the electronic communication system 100 can cause a computing device(s) to perform the methods described herein. Alternatively, the components 102-110 can comprise hardware, such as a special-purpose processing device to perform a certain function. Additionally or alternatively, the components 102-110 can comprise a combination of computer-executable instructions and hardware.

As mentioned above, and as shown in FIG. 1, the electronic communication system 100 can include a user interface manager 102. The user interface manager 102 provides, manages, updates, and/or controls graphical user interfaces (or simply "user interfaces") that allow a user to view and interact with display elements. For example, the user interface manager 102 may identify, display, update, or otherwise provide various user interfaces that contain one or more display elements in various layouts.

More specifically, the user interface manager 102 can display a variety of display elements within a graphical user interface. For example, the user interface manager 102 may display a graphical user interface on a display of a computing device. For instance, display elements include, but are not limited to: buttons, text boxes, menus, thumbnails, scroll bars, hyperlinks, etc. In one or more embodiments, the user interface manager 102 can display and format display elements in any one of a variety of layouts.

Furthermore, the user interface manager 102 can also update, remove, resize, or reposition display elements in response to user interactions. For example, as will be described in more detail below, the electronic communication system 100 may detect user input in a variety of ways. For instance, in one or more embodiments, the detected user input may cause the user interface manager 102 to update a graphical user interface based on the detected input. Similarly, in one or more embodiments, the detected user input may cause the user interface manager 102 to resize one or more display elements, to reposition one or more display elements within the graphical user interface, or to otherwise change or remove one or more display elements within the graphical user interface.

Additionally, the user interface manager 102 can selectively update certain areas of a user interface in response to user interactions. For example, in one or more embodiments, detected user input may cause the user interface manager 102 to update or change within only one area of a graphical user interface. In a particular embodiment, upon a detected user interaction, the user interface manager 102 may update one area within a user interface from one type of display to a second type of display, while continuing to display another area within the user interface with no updates.

Along similar lines, the user interface manager 102 can reorganize a user interface in response to user interactions. For example, in one or more embodiments, detected user input may cause the user interface manager 102 to split a graphical user interface into two or more areas. In a particular embodiment, upon a detected user interaction, the user interface manager 102 may reorganize a user interface from only displaying one area with a first collection of display elements to displaying two areas with the first collection of display elements in the first area and a second collection of display elements in the second area. Likewise, in one or more embodiments, the user interface manager 102 may also consolidate or remove areas within a graphical user interface in response to detected user interactions.

As mentioned above, and as illustrated in FIG. 1, the electronic communication system 100 may further include a user input detector 104. The user input detector 104 detects, receives, and/or facilitates user input in any suitable manner. In some examples, the user input detector 104 detects one or more user interactions. As referred to herein, a "user interaction" means a single input, a combination of inputs, received from a user by way of one or more input devices, or via one or more touch gestures as described above. A user interaction can have variable duration and may take place anywhere on the graphical user interface managed by the user interface manager 102 described above.

For example, the user input detector 104 can detect a user interaction from a keyboard, mouse, touch screen display, or any other input device. In the event a touch screen display is utilized, the user input detector 104 can detect one or more touch gestures that form a user interaction (e.g., tap gestures, swipe gestures, pinch gestures, etc.) provided by a user by way of the touch screen. In some examples, the user input detector 104 can detect touch gestures in relation to and/or directed at one or more display elements displayed as part of the graphical user interface presented on the touch screen display. In one or more embodiments, the user input detector 104 may report any detected touch gesture in relation to and/or directed at one or more display elements to user interface manager 102.

The user input detector 104 may additionally, or alternatively, receive data representative of a user interaction. For example, the user input detector 104 may receive one or more user configurable parameters from a user, one or more user commands from the user, and/or any other suitable user input. For example, the user input detector 104 can receive voice commands or otherwise sense, detect, or receive user input.

The user input detector 104 may additionally, or alternatively detect sound inputs from a user. For example, the user input detector 104 may detect sound inputs from a user received via a microphone. In one or more embodiments, sound inputs may be spoken commands, verbal messages, auditory codes (i.e., Morse code), touch tones (i.e., from a telephone keypad), frequency signals, music, or any other type of sound. In one or more embodiments, the user input detector 104 may send any detected sound inputs to a transcription manager 106 for recording and transcription, as will be described below.

As mentioned above, and as illustrated in FIG. 1, the electronic communication system 100 may further include a transcription manager 106. The transcription manager 106 records, transcribes, and analyzes detected sound inputs and transcriptions. For example, in one or more embodiments, the transcription manager 106 can receive detected sound inputs from the user input detector 104. In a particular embodiment, the transcription manager 106 may record the detected sound inputs. For instance, the transcription manager 106 may store recorded sound inputs in memory, as will be described below with regard to FIG. 6.

The transcription manager 106 may also transcribe sound inputs received from the user input detector 104. For example, in one or more embodiments, the transcription manager 106 may transcribe sound inputs into text. For instance, the transcription manager 106 may receive a detected sound input of a spoken message consisting of a user speaking one or more words, and may then transcribe the one or more spoken words into one or more written words. Thus, the transcription manager 106 may transcribe a sound input into a textual document or file.

In one or more alternative embodiments, the transcription manager 106 may transcribe other types of sound input into a textual document. For example, a sound input may consist of other types of sound besides spoken words, such as Morse code, touch tones, music, or other signals or codes. In one or more embodiments, the transcription manager 106 may transcribe any of these non-verbal sound inputs into a translated textual document or file.

Additionally, in one or more alternative embodiments, the transcription manager 106 may transcribe spoken sound inputs from a first language into a textual document of a second language. For example, a detected spoken sound input may be words spoken in a first language (i.e., English, Spanish, French, German, etc.). In one or more embodiments, the transcription manager 106 may transcribe the detected spoken sound input into a textual document of a different language. In this way, the transcription manager 106 can provide transcriptions that are al so translations.

The transcription manager 106 may also analyze detected sound inputs. For example, a sound input received from the user input detector 104 may be low quality. For instance, a low quality sound input may consist of low-volume, or garbled sounds. In one or more embodiments, the transcription manager 106 may recognize and account for a low quality sound input. In one or more embodiments, low quality sound inputs may be the result of a malfunctioning microphone, an incorrect microphone configuration, or incorrect microphone usage. Also in one or more embodiments, the transcription manager 106 may provide one or more indicators of one or more portions of the sound input received from the user input detector 104 determined to be of low quality.

The transcription manager 106 may also analyze the transcribed textual document or file resulting from a transcription of a sound input. For example, in one or more embodiments, the transcription manager 106 may analyze a transcribed textual document or file resulting from a transcription of a sound input for words that are misspelled, grammatically incorrect, or contextually incorrect. In one or more embodiments, the transcription manager 106 may indicate within the transcribed textual document or file which words are analyzed to be incorrect. Additionally, in one or more embodiments, the transcription manager 106 may provide one or more alternative words for each word analyzed to be incorrect.

Along similar lines, the transcription manager 106 may analyze the transcribed textual document or file for words that may or may not be incorrect. For example, in one or more embodiments, the transcription manager 106 may analyze a textual document or file for one or more words that are likely incorrect. In one or more embodiments, low confidence may be indicated for one or more words that likely have an incorrect spelling, that likely use incorrect grammar, or that are likely used in the wrong context. In one or more embodiments, the transcription manager 106 may provide alternative word suggestions for each word indicated to have low confidence.

The transcription manager 106 may analyze and determine incorrect or low confidence words in any of a variety of ways. For example, the electronic communication system 100 may access one or more algorithms, rules, grammars, or lists in order to analyze and determine incorrect or low confidence words. In one or more embodiments, the one or more algorithms, rules, grammars, or lists may be included as part of the electronic communication system 100. Alternatively, the electronic communication system 100 may access the one or more algorithms, rules, grammars, or lists via a network connection (e.g., via the Internet). In one or more embodiments, the electronic communication system 100 may learn user preferences over time in order to more accurately indicate incorrect or low confidence words.

Additionally, the determination of whether a word or phrase has a low confidence score can be based upon the application of a decision model. The decision model can comprise a machine-learning algorithm. Accordingly, in an embodiment, the electronic communication system 100 includes a machine-learning algorithm configured to create a decision model by analyzing user corrections of words or phrases. For example, a machine learning algorithm may determine, based upon past corrections whether a word or phrase is likely incorrect. Of course, these metrics are merely illustrative; actual machine learning algorithms are able to continually determine different combinations of indicators describing a user and or other circumstance.

In addition to the above, or in the alternative, the transcription manager 106 can utilize one or more algorithmic models and/or machine learning processes to evaluate, analyze, and/or otherwise determine whether a transcribed language element is correct or incorrect (e.g., a probability that a transcribed phoneme, word, phrase, or sentence is correct or incorrect). For example, in one or more embodiments, the transcription manager 106 can utilize a neural network to classify a transcribed language element as being correct or incorrect.

As used herein, a neural network is a system or process that uses statistical learning algorithms to estimate unknown functions that may depend on one or more inputs. In particular, a neural network can include a plurality of interconnected "neurons" (e.g., nodes that represent a function) that can compute values from inputs. Generally speaking, each neuron is adaptable and capable of machine learning and/or pattern recognition. As such, in one or more embodiments, the transcription manager 106 can build and train a neural network, after which the transcription manager 106 can use the trained neural network to determine whether a transcribed language element is correct or incorrect with a high degree of confidence. For example, the transcription manager 106 can use a trained neural network to determine whether a word in a transcribed sentence is correct or incorrect, whether a phrase in a transcribed sentence is correct or incorrect, and/or whether a transcribed sentence is correct or incorrect.

For the purpose of determining whether a word in a transcribed sentence is correct, for example, the transcription manager 106 can build a neural network that can include a plurality of neuron layers. For example, in one or more embodiments, a neural network can include an input layer having one or more neurons (i.e., node functions), a hidden layer that includes a plurality of neurons, and an output layer including at least one neuron. In one or more embodiments, the neural network can have more than one hidden layer within the neural network, in order to add greater accuracy and flexibility to the neural network. For instance, example neural networks can include two, three, four or more hidden layers, wherein each hidden layer includes a plurality of neurons.

Notwithstanding the various types and/or number of neuron layers in a neural network, each neuron of a neuron layer is connected to every neuron in an adjacent neuron layer. For instance, in a typical neural network, each neuron in the input layer is connected by an edge to each and every neuron in the hidden layer, and each neuron in the hidden layer is connected by an edge to each and every neuron in the output layer. Accordingly, data enters the neural network at the input layer and flows through the hidden layer(s) and eventually to the output layer.

The transcription manager 106 can include as many neurons in the input layer as needed to build a neural network that is robust, flexible, and accurate. In one embodiment, the transcription manager 106 may include neurons specific to the word that is being analyzed in the input layer of the neural network. In another embodiment, in order to add context to the analysis, the transcription manager 106 may include additional neurons specific to words surrounding the word that is being analyzed. Additionally, the output layer of the neural network can include as many neurons as there are desired outputs. However, in one embodiment, the transcription manager 106 may only include one neuron in the output layer in order to calculate a binary output (i.e., 1 if the word is correct and 0 if the word is incorrect).

In one or more embodiments, a hidden layer of a neural network includes a plurality of neurons, wherein each neuron performs a computation based on the information it receives via all the incoming edges connected to it. If the transcription manager 106 includes too many neurons in the hidden layer, the neural network becomes incapable of generalization. If the transcription manager 106 includes too few neurons in the hidden layer, the neural network will not be robust enough to properly fit input data during the training phase. Accordingly, in one embodiment, in order to provide a manageable and robust neural network, the transcription manager 106 can include two hidden layers in the neural network, each hidden layer including one hundred and twenty eight neurons. In one or more additional embodiments, however, the neural network can include fewer or additional hidden layers, as needed by a specific embodiment. For example, a neural network can include between one to five hidden layers, or more, depending on the specific features selected to be analyzed within the neural network, as discussed in detail below.

Additionally, in one or more embodiments, the transcription manager 106 can assign a weight to each edge connected to the neurons in the hidden layers such that the neuron to the left side of the edge has a greater or lesser influence on the neuron to the right side of the edge. A weight assigned to an edge connecting two neurons serves to constrain or alter any data that flows through that edge. The transcription manager 106 can determine edge weights during the training phase, as described in more detail below.

In order for the transcription manager 106 to utilize the neural network to determine whether a word in a transcribed sentence is correct, in one or more embodiments, the transcription manager 106 can first train the neural network. For example, the transcription manager 106 can utilize a known training set of inputs to perform a feed-forward back-propagation on the neural network in order to train the neural network into providing a known set of outputs that correspond with the known training set of inputs. In one embodiment, the transcription manager 106 may utilize a training set composed of over a million words and hundreds of thousands of sentences. For example, the transcription manager 106 can train the neural network utilizing an adaptive learning rate schedule scheme call the adaptive gradient algorithm (i.e., "AdaGrad"). Once the transcription manager 106 trains the neural network with known inputs and outputs, the transcription manager 106 can utilize the neural network to provide outputs based on new inputs.

The process for utilizing the trained neural network described above to determine whether a word in a transcribed sentence is correct begins when the transcription manager 106 decodes sound inputs detected by the user input detector 104, or otherwise, transcribes a recorded message into a textual message. As used herein, a recorded message can be any kind of recorded sound input. For example, a recorded message can be live recorded sounds, a previously existing sound file, a digitally re-mastered or edited sound file, sounds played over an electronic connection, etc. Furthermore, as used herein, a textual message can be any electronic text data. In one or more embodiments, for example, a textual message can include any combination of various language elements (e.g., words, combinations of words, phrases, sentences, non-verbal sound cues, etc.).

In order to transcribe a recorded message, the transcription manager 106 first identifies phoneme sequences from the recorded message detected by the user input detector 104. A phoneme is the smallest distinctive unit that can be isolated from a spoken word. In spoken language, each phoneme is produced using a different combination of human speech organs (e.g., tongue, lips, palate, glottis, teeth, etc.).

Once the transcription manager 106 has identified one or more phoneme sequences, the transcription manager 106 can then identify one or more words. For example, the transcription manager 106 can utilize standard dictionary definitions to identify a word that matches a phoneme sequence (i.e., according to the pronunciation guide outlined in every standard dictionary word definition). Once the transcription manager 106 has identified a word corresponding to each of the one or more phoneme sequences, the transcription manager 106 can combine each of the words to form a sentence.

It is possible that due to any of a number of factors, the transcription manager 106 may incorrectly identify some of the one or more phoneme sequences. For example, the sound input detected by the user input detector 104 may include background noise. Alternatively or additionally, the speech within the sound input may be poorly pronounced or too soft, etc. As such, in one or more embodiments, the transcription manager 106 may "mishear" one or more words in a recorded message and provide a transcription of the sound input that includes one or more words that may be incorrect.

In one or more embodiments, in order to account for unintended errors within a transcription, the transcription manager 106 can create a word lattice that includes the sentence transcribed by the transcription manager 106 as well as other sentences that might also be representative of the sound input of the recorded message. For example, the transcription manager 106 may decode a recorded message into the sentence "the fog is back." Despite this, the transcription manager 106 may detect a higher level of background noise in the sound input that interferes with the sound inputs of the "f" in "fog" and the "b" in "back." Accordingly, the transcription manager may explore alternate sentences such as, "the dog is black," "the dog is back," and "the dog Isaac." The transcription manager 106 may only provide the first transcription, "the fog is back," to the user, but may store the alternate sentences in the word lattice.

In one or more embodiments, in determining whether a word in a transcription is likely correct or incorrect, the transcription manager 106 can identify whether a transcribed word is even a word (i.e., whether the phoneme sequence matches the pronunciation of any word in the given language), and can also identify whether a transcribed word, that has been determined to be an actual word, is used correctly in a sentence, based on the word lattice. As mentioned above, the transcription manager 106 can identify one or more words in a transcription that are likely incorrect within the transcription by determining whether the sentence containing the word in the word lattice matches an established language model.

Some sentences, however, may fit within an established language model while still being incorrect transcriptions. For this reason, a neural network can be used to provide more accurate transcription results. Prior to implementing or utilizing the trained neural network, however, the transcription manager 106 can begin the determination as to whether an actual word within a transcribed sentence is correct by determining a baseline a-posteriori confidence level associated with the word. An a-posteriori confidence level is dependent on empirical evidence that is unknowable by reason alone. For example, the transcription manager 106 can utilize the word lattice described above to determine an a-posteriori confidence level that indicates whether a given word in the word lattice is correctly transcribed. The transcription manager 106 can utilize acoustic and language models (i.e., empirical evidence) in order to make this determination. While a determination of an a-posteriori confidence level alone can provide a reasonable percentage of correct words classified as correct transcriptions and incorrect words classified as incorrect, the transcription manager 106 can identify incorrect words with even greater confidence by further utilizing a neural network to build on the baseline a-posteriori confidence level.

As mentioned, in addition to the transcription manager 106 identifying a word lattice based on a recorded message, and determining an a-posteriori confidence level related to a word within the word lattice, the transcription manager 106 can also determine the content of the neurons in an input layer of a neural network by extracting one or more features related to one or more language elements associated with a textual message base on a transcription of a recorded message. For example, with relation to a single language element in a textual message, the transcription manager 106 can extract features related only to the language element, features related to contextual language elements in the textual message, features related to the textual message, features related to the recorded message from which the textual message was transcribed, features related to the a-posteriori confidence level associated with the language element, and features related to the language element in the word lattice. By extracting these features for the language element, and also for contextual language elements in the textual message, the transcription manager 106 can build the input layer of the neural network.

In one or more embodiments, in order to determine whether a word in a transcribed sentence is correct with a very high confidence level, the transcription manager 106 can extract, or otherwise determine, various features of the recorded message and the textual message, including features of one or more language elements within the textual message. For example, the transcription manager 106 can utilize extracted features as neurons in the input layer of the neural network. When used as an input neuron, an extracted feature is represented as a numerical value (e.g., input value), as will be described in more detail below. Each extracted feature can include a computation based on the sound input, the textual message, the word lattice, the a-posteriori confidence level, the analysis word upon which the determination of correctness is being made, and/or one or more characteristics of various other language elements within the textual message.

In one or more embodiments, the transcription manager 106 can extract nineteen specific features related to the analysis word. Then, in order to provide added context, the transcription manager 106 can extract the same nineteen features for each of the two words preceding the analysis word, and each of the two words following the analysis word. For the contextual words, the process of extracting the nineteen features is the same as the process used to extract the nineteen features for the analysis word. The only difference is that the transcription manager 106 treats each contextual word as though it were the analysis word, for the purpose of the extraction. Thus, the transcription manager 106 eventually calculates ninety-five input neuron values for the input layer (e.g., two words in front of the analysis word, the analysis word, and two words after for a total of five words multiplied by nineteen features). In additional or alternative embodiments, the transcription manager 106 can include fewer or additional neurons in the input layer. For example, in one embodiment, the transcription manager 106 can extract features for more or fewer contextual words in front of the analysis word, and/or more or fewer contextual words after the analysis word. Furthermore, in additional or alternative embodiments, the transcription manager 106 may extract fewer or additional features than those listed below.

The extracted features for the analysis word and the contextual words can be grouped based on whether each extracted feature is related to the sound input, the textual message, the word lattice, the a-posteriori confidence level, the analysis word upon which the determination of correctness is being made, and/or one or more characteristics of various other language elements within the textual message. For example, an extracted feature that is related to the sound input is a determination of a duration of the analysis word. For example, in one or more embodiments, the sound input is an analog input including multiple frames that each include various signals that indicate sounds made by a user. In one or more embodiments, the more frames in the sound input that are taken up by the analysis word, the more likely it is that the analysis word is correct (e.g., an analysis word with a long duration was likely spoken slowly, and thus more likely to have been transcribed correctly).

Another example of an extracted feature that is related to the sound input is a logarithmic value that reflects a probability of how well the sound input corresponding to the analysis word matches an acoustic model (the "acoustic model log probability"). For example, the transcription manager 106 can utilize standardized acoustic models that represent sound inputs for a variety of words. In one or more embodiments, the higher the probability of how well the analysis word matches the acoustic model, the more likely the analysis word is correct.

Furthermore, another example of an extracted feature that is related to the sound input is a determination of energy within the sound input. Specifically, it is a determination of the energy of the signal over the word (i.e., $E_s = \int_{-\infty}^{\infty} |x(t)|^2 dt$). As mentioned above, the sound input can include auditory data in the form of a signal. In one or more embodiments, the higher the energy of the signal over the portion of the sound input corresponding to the analysis word, the more likely the analysis word is correct.

Additionally, an example of an extracted feature that is related to the sound input is a determination of a zero-crossing rate. For example, as mentioned above, the sound input can include auditory data in the form of a signal or a waveform that spans a plurality of frames. A zero-crossing is the point at which the waveform crosses the horizontal axis indicating a change in sign of the associated mathematical function (e.g., from positive to negative). In most embodiments, a high zero-crossing rate is correlated with noise, as opposed to speech. Accordingly, in one or more embodiments, the lower the zero-crossing rate is over the portion of the sound input corresponding to the analysis word, the more likely the analysis word is correct.

A further example of an extracted feature that is related to the sound input is a determination of a number of frames in the sound input between the sound input portion corresponding to the analysis word and the most previous, non-filler word (i.e., the "left distance"). For example, a "filler word" is an element within the sound input that is not decoded into a word, such as a breath or hesitation. In one or more embodiments, the lower the number of frames between the sound input portion corresponding to the analysis word and the most previous, non-filler word, the more likely the analysis word is correct. Similarly, another example of an extracted feature that is related to the sound input is a determination of a number of frames in the sound input between the sound input portion corresponding to the analysis word and the next non-filler word (i.e., the "right distance"). In one or more embodiments, the lower the number of frames between the sound input portion corresponding to the analysis word and the next non-filler word, the more likely the analysis word is correct.

Additionally, an example of an extracted feature that is related to the sound input is a standard deviation of the signal magnitude of the sound input over the portion of the sound input that corresponds to the analysis word (i.e., the "magnitude variation"). For example, as mentioned above, the sound input may be in the form of a waveform including a wave with a magnitude. In one or more embodiments, the higher the standard deviation of the signal magnitude of the sound input over the portion of the sound input corresponding to the analysis word, the more likely the analysis word is correct.

Furthermore, an example of an extracted feature that is related to the sound input is a determination of a ratio between the mean of the signal magnitude of the sound input over the portion of the sound input corresponding to the analysis word and the standard deviation of the signal magnitude over the same portion (i.e., the "signal-to-noise ratio"). In one or more embodiments, the higher this ratio, the more likely the analysis word is correct.

An additional feature related to sound input includes a logarithmic value that reflects a probability of how well the sound input corresponding to the analysis word matches an acoustic model in combination with a probability of how well the sound input corresponding to the analysis word matches an acoustic model (i.e., the "log probability of the hypothesis"). In one or more embodiment, the higher this probability, the more likely the analysis word is correct.

In addition to features related to sound input, and as mentioned above, the transcription manager 106 can extract various features related to the textual message (e.g., a sentence that makes up the textual message). For example, one feature the transcription manager 106 can extract that is related to the textual message is a logarithmic value based on the length of the sentence containing the analysis word (i.e., the "log sentence length"). For example, the transcription manager 106 can determine a logarithmic value because the difference in correctness between a nine-word sentence and a five-word sentence may be smaller than the difference in correctness between a five-word sentence and a one-word sentence. In one or more embodiments, the lower this logarithmic value is, the more likely the analysis word in the sentence is correct.

Furthermore, another example of an extracted feature that is related to the textual message is a determination of the relative position of the analysis word within the decoded sentence (i.e., the "relative word position"). For example, transcription manager can determine "i/n" where "i" is the index of the analysis word and "n" is the number of words in the decoded sentence. In one or more embodiments, the closer the analysis word is to the middle of the decoded sentence, the more likely the analysis word is correct (i.e., a user likely speaks more clearly in the middle of a sentence, rather than at the beginning or end of a sentence).

Additionally, an example of an extracted feature that is related to the textual message is a logarithmic value that reflects a probability of how well the analysis word and its three predecessors (i.e., the "log 4-gram probability") in the decoded sentence fit a language model (i.e., the "language model log probability"). For example, the transcription manager 106 can utilize standardize language models that represent common word combinations. In one or more embodiments, the higher the probability of how well the analysis word and its three predecessors fit a language model, the more likely the analysis word is correct.

Another example of an extracted feature that is related to the textual message is a logarithmic value that reflects a probability of how well a unigram fits a language model (i.e., the "log unigram probability"). For example, a unigram (i.e., an "n-gram" model) is a type of probabilistic language model for predicting the next item in a sequence. If the sequence in this computation is the decoded sentence, the logarithmic value increases as each subsequent word in the decoded sentence fits a standardized language model. In one or more embodiments, the higher the probability of how well the unigram fits the language model, the more likely the analysis word is correct.

Also as mentioned above, the transcription manager 106 can extract various features related to a first language element (e.g., the analysis word). For example, an extracted feature that is related to the first language element is a logarithmic value based on the length of the analysis word (i.e., the "log word length"). For example, the transcription manager 106 can determine a logarithmic value because the difference in correctness between a nine-character word and a five-character word may be smaller than the difference in correctness between a five-character word and a one-character word. In one or more embodiments, the lower this logarithmic value is, the more likely the analysis word is correct.

Additionally, another example of an extracted feature that is related to a first language element is a number of times the analysis word was incorrectly transcribed in the training set used to train the neural model, divided by its unigram probability, described above (i.e., the "confusion probability"). As mentioned above, the neural model can be trained using training sets containing millions of words and hundreds of thousands of sentences. The lower the value representing the number of times the analysis word was incorrectly transcribed in the training set used to train the neural model, divided by its unigram probability, the more likely the analysis word is correct.

Furthermore, as mentioned above, the transcription manager 106 can extract various features related to the a-posteriori confidence level. For example, an extracted feature that is related to the a-posteriori confidence level is the a-posteriori confidence level itself, as described above. Additionally, another extracted feature that is related to the a-posterior confidence level is a mean a-posteriori confidence level. As described above, the higher the a-posteriori confidence level is related to an analysis word, the more likely it is that the analysis word is correct. Similarly, the mean a-posteriori confidence level is a mean of the a-posteriori confidence levels related to each word in the decoded sentence. In one or more embodiments, the higher the mean a-posteriori confidence level is the more likely the analysis word is correct.

Finally, as mentioned above, the transcription manager 106 can extract various features related to the word lattice. For example, an extracted feature that is related to the word lattice is a determination of a percentage of occurrences of the analysis word in the "N-best list." For example, as discussed above, the word lattice can include a sentence that the transcription manager 106 decoded from the sound inputs, as well as other alternative sentences that may correct depending on how easy the sound inputs were to decode. In one embodiment, the N-best list is a list of the sentences within the word lattice that are more likely to be accurate transcriptions of the sound inputs. In one or more embodiments, the more often the analysis word occurs within the N-best list of sentences within the word lattice, the more likely the analysis word is correct.

Furthermore, another example of an extracted feature that is related to the word lattice is a determination of a sum of logarithmic probabilities of the sentences from the word lattice that are in the N-best list, divided by the size of the N-best list (i.e., the "mean weighted log probability in the N-best list"). For example, the sum of logarithmic probabilities can take into account the language model and acoustic model discussed above. In one or more embodiments, the higher the sum of these logarithmic probabilities divided by the size of the N-best list, the more likely the analysis word is correct.

As discussed above, the trained neural network includes an input layer that has multiple input neurons. In one embodiment, the transcription manager 106 can associate each input neuron in the input layer with one of the extracted features described above. As mentioned above, in one embodiment, the input layer includes nineteen input neurons identified above. In another embodiment, however, in order to add context and accuracy to the neural network, the transcription manager 106 can extract the same nineteen features described above for the two words in the decoded sentence preceding the analysis word and the for the two words in the decoded sentence following the analysis word. In that case, as described above, the input layer would include ninety-five input neurons associated with the nineteen features for each of the five words.

As mentioned above, in one or more embodiments, the transcription manager 106 can assign a weight to the edges connecting the neurons in the input layer to the neurons in the hidden layer. For example, of the features described above, some features may prove to be more relevant in a determination as to whether a word has been correctly transcribed. For instance, features such as the a-posteriori confidence level, the mean a-posteriori confidence level, the percentage of occurrences in the N-best list, and the language model log probability have proven to be highly relevant in the determination as to whether a word has been correctly transcribed. Accordingly, the transcription manager 106 can assign a heavier weight to the edges connected to input neurons associated with those features.

Once the transcription manager 106 configures the input layer with neurons associated with the features described above related to the analysis word as well as the two preceding and following words (e.g., in one or more embodiments, ninety-five input values), the transcription manager 106 can use the trained neural network to determine whether an analysis word is correct. For example, as described above, the transcription manager 106 can train the neural network using a known set of inputs an outputs. Once the transcription manager 106 has trained the neural network, the transcription manager 106 can process a new set of input values (e.g., via the input neurons associated with the features described above related to the analysis word as well as the two preceding words and the two following words) and receive a fairly confident determination as to whether the analysis word is correctly transcribed via the output neuron. Also as mentioned above, the transcription manager 106 may include only one neuron in the output layer, as the purpose of the neural network is to calculate a binary output (i.e., 1 if the analysis word is correct and 0 if the word is incorrect).

In some embodiments, it is possible that the analysis word is toward the beginning or the end of a transcribed sentence. In that case, the transcription manager 106 may not be able to extract features from the two words preceding or following an analysis word, as the case may be. In such a case, the transcription manager 106 may assign random values for these missing features. In alternative embodiments, the transcription manager 106 may assign a value of "1" in place of features that the transcription manager 106 has deemed highly relevant, and a value of "0" in place of features that the transcription manager 106 has deemed less relevant. In yet other alternative embodiments, the transcription manager 106 may simply duplicate the extracted features of the analysis word in place of the features of the missing word(s).

Once the transcription manager 106 has determined, via any model or method described above that a given word is incorrect, the transcription manager 106 may provide one or more alternative word suggestions for the word. For example, the transcription manager 106 may provide one or more alternative word suggestions based on the one or more algorithms, rules, grammars, or lists used to analyze each of the words in the transcribed textual document or file. In one embodiment, the transcription manager 106 may provide alternative word suggestions based on the word lattice described above. In one or more examples, the transcription manager 106 may deliver the transcription of the detected sound input, the indicators of incorrect or low confidence words, as well as the one or more alternative word suggestions for each incorrect or low confidence word to user interface manager 102.

As mentioned above, and as illustrated in FIG. 1, the electronic communication system 100 may further include a communication manager 108. The communication manager 108 can facilitate receiving and sending data to and from the electronic communication system 100, or a device upon which the electronic communication system 100 is implemented. In particular, the communication manager 108 can instruct or activate one or more communication interfaces of a computing device, as described below to send or receive data, particularly data related to electronic communications. Furthermore, the communication manager 108 can package or format content items to be sent or received from the electronic communication system 100 in any necessary form that is able to be sent through one or more communication channels and using an appropriate communication protocol, as described further below with reference to FIG. 6.

As discussed above, the electronic communication system 100 can include a data storage 110, as illustrated in FIG. 1. The data storage 110 may maintain transcription data 112 representative of data associated with transcriptions based on detected sound inputs. For example, the transcription data 112 may include, but is not limited to: recordings of sound inputs; transcriptions of sound inputs; analyses of transcriptions of sound inputs; indicators of incorrect or low confidence words from transcriptions; alternative suggestions to incorrect or low confidence words; and algorithms, rules, grammars, or lists used to analyze each of the words in a transcription.

Figure 2:
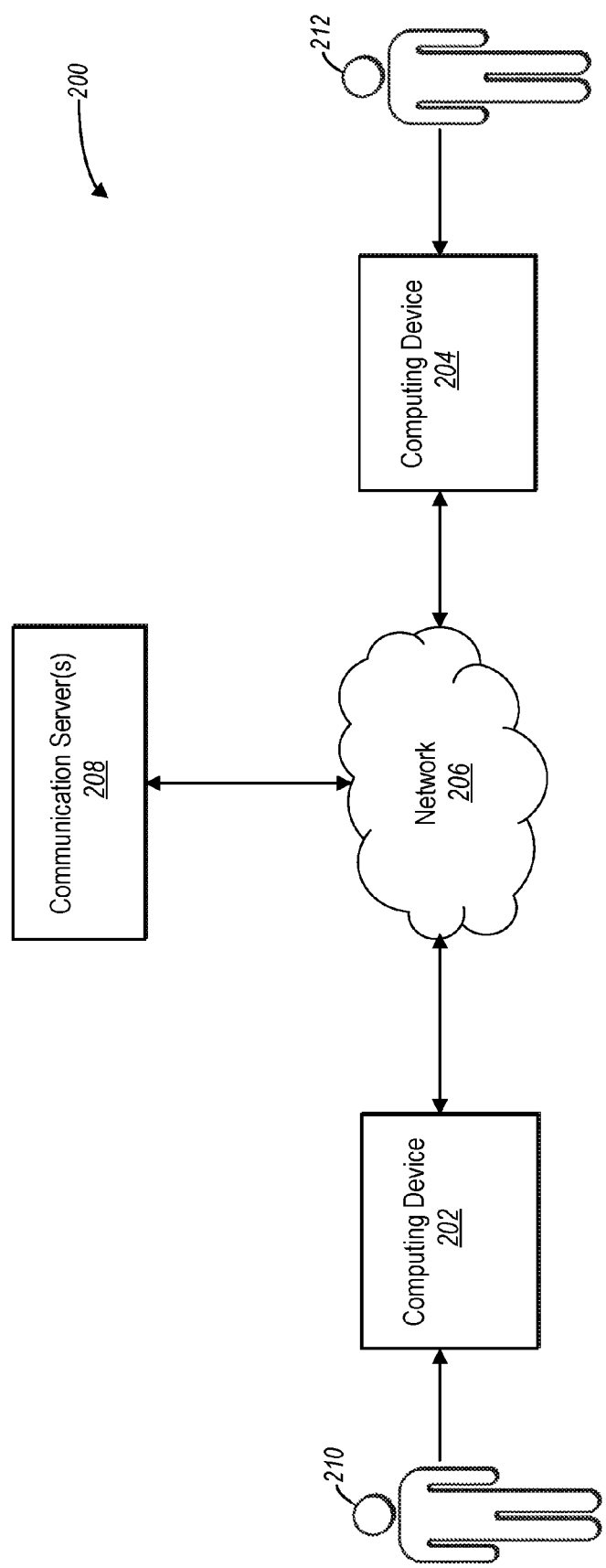
FIG. 2 illustrates a block diagram of an environment for implementing the system of FIG. 1 in accordance with one or more embodiments.

FIG. 2 is a schematic diagram illustrating an example system 200, within which one or more embodiments of the electronic communication system 100 can be implemented. As illustrated in FIG. 2, the system 200 can include computing devices 202, 204, a network 206, and a communication server 208. The computing devices 202, 204, the network 206, and the communication server 208 may be communicatively coupled, as shown in FIG. 2. Although FIG. 2 illustrates a particular arrangement of the computing devices 202, 204, the network 206, and the communication server 208, various additional arrangements are possible. For example, the computing devices 202, 204 may directly communicate with the communication server 208, bypassing the network 206, or alternatively, may directly communicate with each other.

The computing devices 202, 204, the network 206, and the communication server 208 may communicate using any communication platforms and technologies suitable for transporting data and/or communication signals. For example, the computing devices 202, 204, the network 206, and the communication server 208 may communicate via any known communication technologies, devices, media, and protocols supportive of remote data communications, examples of which will be described in more detail below with respect to FIG. 7. In addition, in certain embodiments, the computing devices 202, 204, and the communication server 208 may communicate via the network 206, which may include one or more social networks as described further below with respect to FIG. 7.

The communication server 208 may generate, store, receive, and transmit electronic communication data. For example, the communication server 208 may receive an electronic communication from the computing device 202 and send the received electronic communication to the computing device 204. In particular, the communication server 208 can transmit electronic messages between one or more users of the system 200. The communication server 208 can receive a wide range of electronic communication types, including but not limited to, text messages, instant messages, social-networking messages, social-networking posts, emails, and any other form of electronic communication. Additional details regarding the communication server 208 will be discussed below with respect to FIG. 6.

The network 206 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 206 may be any suitable network over which the computing device 202 may access the communication server 208 and/or the computing device 204, or vice versa. The network 206 will be discussed in more detail below with regard to FIGS. 6 and 7.

In addition to the system and network elements of the system 200, FIG. 2 illustrates that a user 210 can be associated with the computing device 202, and that a user 212 can be associated with the computing device 204. Although FIG. 2 illustrates only two users 210, 212, the system 200 can include a large number of users, with each of the users interacting with the system 200 through a corresponding number of computing devices. For example, the user 210 can interact with the computing device 202 for the purpose of composing, and sending an electronic communication (e.g., instant message). The user 210 may interact with the computing device 202 by way of a user interface, managed by the user interface manager 102, on the computing device 202. For example, the user 210 can utilize the user interface to cause the computing device 202 to compose and send an electronic communication to one or more of the plurality of users of the system 200.

In one or more embodiments, the components 102-110, as described with regard to FIG. 1, may be implemented on one or more of the computing devices 202, 204 and the communication server 208. For example, the computing devices 202, 204, and the communication server 208 may communicate across the network 206 via the communication manager 108 of the electronic communication system 100. In one or more embodiments, the computing devices 202, 204 may receive user inputs via the user input detector 104. Likewise, in one or more embodiments, the computing devices 202, 204 may provide graphical user interfaces via the user interface manager 102. Furthermore, in one or more embodiments each of the computing devices 202, 204 can include an instance of the electronic communication system 100.

As will be described in more detail below, each of the components 100-110 of the electronic communication system 100 as described with regard to FIGS. 1 and 2, can provide, alone and/or in combination with the other components of the electronic communication system 100, one or more graphical user interfaces. In particular, the components 102-110 can allow a user to interact with a collection of display elements for a variety of purposes. In particular, FIGS. 3A-3K and the description that follows illustrate various example embodiments of the user interfaces and features that are in accordance with general principles as described above.

In some examples, a computing device (i.e., computing device 202, 204 of FIG. 2) can implement part or all of the electronic communication system 100. For example, FIG. 3A illustrates a computing device 300 that may implement one or more of the components 102-110 of the electronic communication system 100. As illustrated in FIG. 3A, the computing device 300 is a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, a handheld device, larger wireless devices, a laptop or desktop computer, a personal-digital assistant device, and/or any other suitable computing device can perform one or more of the processes and/or operations described herein.

The computing device 300 can include any of the features and components described below in reference to a computing device 600 of FIG. 6. As illustrated in FIG. 3A, the computing device 300 includes a touch screen display 302 that can display or provide user interfaces and by way of which user input may be received and/or detected. As used herein, a "touch screen display" refers to the display of a touch screen device. In one or more embodiments, a touch screen device may be a computing device 202, 204 with at least one surface upon which a user 210, 212 may perform touch gestures (e.g., a laptop, a tablet computer, a personal digital assistant, a media player, a mobile phone). Additionally or alternatively, the computing device 300 may include any other suitable input device, such as a touch pad or those described below in reference to FIG. 6.

FIG. 3A illustrates a touch screen display 302 of the computing device 300 displaying one embodiment of a graphical user interface, in particular a messaging graphical user interface 304. For example, the user interface manager 102 provides various display areas and display elements as part of the messaging graphical user interface 304. In one or more embodiments, the user interface manager 102 provides a communication thread 306, as well as a message input control palette or toolbar 310.

As described above, the communication manager 108 of the electronic communication system 100 can facilitate receiving and sending data. In one or more embodiments, the communication manager 108 facilitates receiving and sending electronic communications between the computing devices 202, 204. Also in one or more embodiments, the user interface manager 102 displays electronic communications sent and received via the communication manager 108. In a particular embodiment, the user interface manager 102 can display electronic communications sent and received via the communication manager 108 in the communication thread 306 within the messaging graphical user interface 304.

For example, as illustrated in FIG. 3A, the user interface manager 102 provides the communication thread 306 that includes electronic communications 308a sent by a user of the communication device 300. Similarly, the communication thread can include electronic messages 308b received by computing device 300. In one or more embodiments, the user interface manager 102 organizes the communication thread 306 such that newest messages are added to the bottom of the thread with oldest messages displayed at the top of the thread. In alternative embodiments, the user interface manager 102 may organize the messages 308a, 308b in any manner that may indicate to a user the chronological relationship between the displayed messages. As shown, the electronic communications 308a are messages sent by the communication manager 108, and the electronic communications 308b are messages received by the communication manager 108. In one or more embodiments, the electronic communications 308a are composed by a user on the computing device 300 and sent to one or more co-users by the communication manager 108. On the other hand, the communication manager 108 receives the electronic communications 308b at the computing device 300 from the one or more co-users.

The user interface manager 102 provides a variety of electronic communication characteristics to help a user distinguish between electronic communications in the communication thread 306. For example, as illustrated in FIG. 3A, the user interface manager 102 displays the electronic communications 308a sent from an account of the user of the computing device 300 pointed toward one side (i.e., the right side) of the messaging graphical user interface 304. On the other hand, the user interface manager 102 displays the electronic communications 308b received by the communication manager 108 pointed toward the opposite side (i.e., the left side) of the messaging graphical user interface 304. In one or more embodiments, the positioning and orientation of the electronic communications 308a, 308b provides a clear indicator to a user of the computing device 300 of the origin of the various electronic communications displayed within the messaging graphical user interface 304.

Another electronic communication characteristic provided by the user interface manager 102 that helps a user distinguish electronic communications may be a color of the electronic communications. For example, as shown in FIG. 3A, the user interface manager 102 displays sent electronic communications 308a in a first color, while received electronic communications 308b are displayed in a second color. In one or more embodiments, the first and second colors may be black and white, respectively, with an inverted typeface color, or may be any other color. In an alternative embodiment, the user interface manager 102 may display the electronic communications 308a, 308b with white backgrounds and different colored outlines.

In yet another alternative embodiment, the user interface manager 102 may display the electronic communications 308a, 308b with backgrounds of different patterns, in different fonts, in different sizes or in any other manner that may distinguish the sent electronic communications 308a from the received electronic communications 308b. For example, in a particular embodiment, the user interface manager 102 displays sent electronic communications 308a with white typeface on a blue background. Likewise, in a particular embodiment, the user interface manager 102 displays received electronic communications 308b with black typeface on a grey background.

As mentioned above, the user interface manager 102 may also provide a message input control palette or toolbar 310. As illustrated in FIG. 3A, the user interface manager 102 displays the message input control palette 310 as part of the messaging graphical user interface 304. In one or more embodiments, the message input control palette 310 includes a variety of selectable message input controls that provide a user with various message input options or other options. For example, in FIG. 3A, the message input control palette 310 includes a text input control 312a, a photo input control 312b, a file input control 312c, a symbol input control 312d, and a sound input control 312e. In one or more alternative embodiments, the message input control palette 310 may provide the input controls 312a-312e in a different order, or may provide other input controls not displayed in FIG. 3A.

As will be described below in greater detail, a user may interact with any of the input controls 312a-312e in order to compose and send different types of electronic communications. For example, in one or more embodiments, if a user interacts with the text input control 312a, the user interface manager 102 may provide a touch screen display keyboard in a portion of the messaging graphical user interface 304 that the user may utilize to compose a textual message. Similarly, in one or more embodiments, if a user interacts with the photo input control 312b, the user interface manager 102 may provide a digital camera interface within a portion of the messaging graphical user interface 304 that the user may utilize to add a photo to the communication thread 306. Likewise, in one or more embodiments, if a user interacts with the file input control 312c, the user interface manager 102 may provide a gallery of multimedia files (e.g., digital photographs, digital videos) within a portion of the messaging graphical user interface 304. Furthermore, and as will be described in greater detail below, if a user interacts with the sound input control 312e, the user interface manager 102 may provide a sound recording control by way of which the user can provide sound input that the computing device 300 can record. Once recorded, the electronic communication system 100 can transcribe and send the recording.

A user may interact with any of the message input controls 312a-e in order to compose and send a message to one or more co-users via the electronic communication system 100. For example, as shown in FIG. 3A, a finger 314 of a user's hand is shown interacting with the sound input control 312e. In one or more embodiments, the detected interaction of the finger 314 of the user's hand with the sound input control 312e, as illustrated in FIG. 3A, may be a tap touch gesture. For example, upon the user input detector 104 detecting a tap touch gesture on the sound input control 312*e*, the user interface manager 102 can display a message input control area 316 containing a sound recording control 318, as illustrated in FIG. 3B. As shown in FIG. 3B, the user interface manager 102 reorganizes the messaging graphical user interface 304 in response to the detected tap touch gesture such that the messaging graphical user interface 304 is split between the communication thread 306 and the message input control area 316. The message input control area 316 can further include an input control indicator 322. In one or more embodiments, the user interface manager 102 displays the input control indicator 322 so as to indicate which message input control 312*a-e* is currently active.

The user interface manager 102 may also provide an indicator within the messaging graphical user interface 304 of whether the user input detector 104 is properly detecting sound. For example, prior to recording a sound message, a user may want to double check that the electronic communication system 100 is properly detecting sounds via a microphone associated with the computing device 300. Accordingly, in one or more embodiments, the user input detector 104 may passively detect sound. Furthermore, in one or more embodiments, the user interface manager 102 may provide a sound indicator 320 that indicates the sounds that are passively detected by the user input detector 104. For instance, as shown in FIG. 3B, the sound indicator 320 may be a waveform, wherein peaks and valleys represent variances in the volume of the detected sound. In one or more alternative embodiments, the user interface manager 102 may display the sound indicator 320 as a different type of waveform, or alternatively as another type of chart or graph.

In one or more embodiments, the sound indicator 320 may continue to indicate detected sounds even while the user is not making a sound recording. For example, as shown in FIG. 3B, the sound indicator 320 may indicate sounds passively detected by user input detector 104. In other words, the sound indicator 320 may indicate sounds that are detected even though the transcription manager 106 is not making a recording and/or transcription of the detected sounds. In one or more embodiments, the sound indicator 320 may continue to indicate detected sounds while the transcription manager 106 is making a recording and/or transcription of the detected sounds.

A user may initiate the creation of an electronic communication based on a sound input by interacting with the sound recording control 318. For example, as illustrated in FIG. 3B, the sound recording control 318 may be a record button. In one or more alternative embodiments, the sound recording control 318 may be an icon, a picture, or another type of control suitable for this purpose.

The process for creating an electronic communication based on a sound input will now be described with reference to FIGS. 3C-3F. A user may activate a microphone on the computing device 300 and cause the transcription manager 106 to record a message by performing a press-and-hold touch gesture via a finger 314 or other input object on sound recording control 318. For example, as illustrated in FIG. 3C, a user may begin speaking while the finger 314 engages in a press-and-hold touch gesture with the sound recording control 318. In one or more embodiments, the user input detector 104 forwards any detected sounds to the transcription manager 106 in response to, and during the duration of, the detected press-and-hold touch gesture with the sound recording control 318. In a particular embodiment, the transcription manager 106 may record the detected sounds forwarded from the user input detector 104. Also in a particular embodiment, the transcription manager 106 may also transcribe the detected sounds forwarded from the user input detector 104.

In one or more embodiments, the user interface manager 102 may display the transcription of the detected sounds as the transcription manager 106 performs the transcription. For example, as shown in FIG. 3C, the user interface manager 102 may display a transcription indicator 326. In one or more embodiments, the transcription indicator 326 includes each word of a transcription. For example, in FIG. 3C, the transcription manager 106 is transcribing sounds consisting of the spoken words, "but I'm." Accordingly, and as shown, the transcription indicator 326 includes the words, "but I'm" written out in text.

In one or more embodiments, the transcription indicator 326 may expand with each newly transcribed word received from the transcription manager 106. For example, as shown in FIG. 3C, if the transcription manager 106 continues to transcribe other spoken words, the transcription indicator 326 may be expanded to include, "but I'm just now feeling a little sick." Accordingly, in one or more embodiments, the transcription indicator 326 would include the full sentence, "but I'm just now feeling a little sick." In one or more alternative embodiments, the transcription indicator 326 may only include one transcribed word at a time. For example, the user interface manager 102 may update the transcription indicator 326 to only include one word at a time as each transcribed word is received from the transcription manager 106.

The user interface manager 102 may also include other indicators within the messaging graphical user interface 304 regarding a recording made by the transcription manager 106. For example, as illustrated in FIG. 3C, the user interface manager 102 may include a recording time indicator 328. In one or more embodiments, the recording time indicator 328 may be a bar that extends from one side of the messaging graphical user interface 304 to indicate how a length of a recording. Accordingly, in one or more alternative embodiments, the recording time indicator 328 indicates the length of the recording in real time. In one or more embodiments, the electronic communication system 100 can be configured to allow recordings of a certain length (e.g., 60 seconds or less). In such embodiments, the recording time indicator 328 can also provide an indication of how much longer the recording may be before the transcription manager 106 will stop recording (i.e., when the bar reaches the opposite side of the messaging graphical user interface 304 the transcription manager 106 must stop recording).

In one or more alternative embodiments, the user interface manager 102 may display the recording time indicator 328 differently. For example, in FIG. 3C, the recording time indicator 328 is a solid bar extending from the left side of the messaging graphical user interface 304. In one or more alternative embodiments, the recording time indicator 328 may be a series of hash marks extending from one side of the messaging graphical user interface 304. Alternatively, the recording time indicator 328 may be a pie chart that gradually fills in. In one or more embodiments, the user interface manager 102 may display the recording time indicator 328 in any manner suitable for this purpose.

The user interface manager 102 may also include instructions or other usage guides within the messaging graphical user interface 304. For example, as shown in FIG. 3C, the user interface manager 102 displays instruction 324 within messaging graphical user interface 304, which states, "Swipe up to cancel recording." In one or more embodiments, the instruction 324 may relate to the action currently being taken by the user. For example, in FIG. 3C, the user is holding down the sound recording control 318 with finger 314 in order to record a voice message. Accordingly, the instruction 324 gives instructions related to canceling the recording.

In one or more alternative embodiments, the instruction 324 may be related to something other than the actions of the user. For example, in an alternative embodiment, the instruction 324 may include a timestamp indicating how long the user has held down the sound recording control 318. In another example, the instruction 324 may include a timestamp indicating how much longer a user may hold down the sound recording control 318 before the transcription manager 106 stops recording.

In another alternative embodiment, the instruction 324 can relate to the transcription performed by the transcription manager 106. For example, in one or more embodiments, if the transcription manager 106 determines that the number of low-confidence words in a transcription rises above a certain level, the instruction 324 may include a statement like, "I'm sorry, I can't understand you." Similarly, in one or more embodiments, if the transcription manager 106 determines that the detected sound inputs are not loud enough to accurately transcribe, instruction 324 may include a statement like, "Please speak up."

The user may decide, while pressing the sound recording control 318 with finger 314, to cancel the recording and/or the transcription being made by the transcription manager 106. For example, as illustrated in FIG. 3D, the user input detector 104 may detect the finger 314 of the user's hand sliding off the sound recording control 318 along arrow 330. In one or more embodiments, the transcription manager 106 may stop recording and/or discard the transcription of the recording in response to a detected input such as illustrated in FIG. 3D. In one or more alternative embodiments, the transcription manager 106 may stop recording and/or transcribing in response to a different type of user input, such as but not limited to a sliding touch gesture in a different direction, a voice command, shaking the computing device 300 up and down or side to side, or any other type of user input suitable for this purpose.

Using the electronic communication system 100, a user may create an electronic communication based on a sound input by holding down the sound recording control 318 while providing a sound input, and releasing the sound recording control 318 to create and send an electronic communication based on the sound input to one or more co-users. For example, as illustrated in FIGS. 3E and 3F, a user holds down the sound recording control 318 with a press-and-hold touch gesture performed by the user's finger 314. During the duration of the press-and-hold touch gesture, the user input detector 104 forwards detected sounds to the transcription manager 106, which in-turn records the detected sounds and creates a transcription of the detected sounds. As shown in FIG. 3E, the transcription indicator 326 indicates that the transcription manager 106 has currently transcribed the words, "Sorry but" based on the detected sound input.

The user continues to hold down the sound recording control 318 in FIG. 3F while continuing to provide further sound inputs. As shown, the transcription indicator 326 indicates that the transcription manager 106 has now transcribed the words, "Sorry but I'm sunning". Additionally, as shown in FIG. 3F, the user interface manager 102 has updated the recording time indicator 328 such that the recording time indicator 328 extends farther away from the side of the messaging graphical user interface 304 than shown in FIG. 3E. In one or more embodiments, the recording time indicator 328, as shown in FIG. 3F, indicates that transcription manager 106 has used up approximately one-third of the available recording time, as discussed above.

In response to a detected release of the sound recording control 318, communication manager 108 can, without further user interaction, send the recorded message and a transcription of the recorded message to one or more co-users 212 via the communication server 208. By sending the recorded message and the transcription of the recorded message upon release of the sound recording control 318, the electronic communication system 100 can foster spontaneous, real time communication. This is in contrast to systems that first provide an editing option prior to sending the message or a transcription thereof.

Along related lines, the user interface manager 102 may send electronic communication to the communication thread 306 based on the detected sound inputs recorded and transcribed by the transcription manager 106. For example, as illustrated in FIG. 3G, the user interface manager 102 added electronic communication 308a' to the communication thread 306. In one or more embodiments, the electronic communication 308a' includes a recorded message and a transcription of the recorded message. For example, as shown in FIG. 3G, electronic communication 308a' may include a playback control 334. In one or more embodiments, the playback control 334 further includes other control elements such as a play button 340 and a length indicator 342. In a preferred embodiment, when user input detector 104 detects an interaction with the play button 340 of the playback control 334, the recorded message associated with the electronic communication 308a' may be played through a speaker associated with the computing device 300. Also in a preferred embodiment, the length indicator 342 indicates how much time the recorded message associated with the electronic communication 308a' takes to play from beginning to end. In one or more embodiments, the length indicator 342 may count down during a playback of the recorded message initiated by a user interaction with the play button 340. Additionally, in one or more embodiments, once playback begins, the play button 340 may move along the playback control 334 so as to indicate how much of the recording has played, and how much of the recording remains.

As mentioned above, the electronic communication 308a' may also include a transcribed textual message provided by the transcription manager 106. For example, as shown in FIG. 3G, the electronic communication 308a' includes a transcribed textual message 332. As described above, the transcription manager 106 provided the transcribed textual message 332, which reads, "Sorry, but I'm sunning a few minuets late" based on the detected sound input of the spoken words, "Sorry, but I'm running a few minutes late." Accordingly, the words "running" and "minutes" were transcribed incorrectly, for reasons that might include the user not speaking loudly enough, the user not speaking clearly enough, microphone error, etc.

In a preferred embodiment, the electronic communication 308a' also includes an analysis of the transcribed textual message 332 provided by the transcription manager 106. For example, as shown in FIG. 3G, the user interface manager 102 may provide one or more low-confidence indicators 336a, 336b associated with words analyzed by the transcription manager 106 to likely be incorrect. As described above, the transcription manager 106 can determine whether each word in a given sentence is correct using grammars, algorithms, neural networks, etc. In one embodiment, the user interface manager 102 can provide the low confidence indicators 336*a*, 336*b* associated with words that have resulted in an output of "0" from the neural network described above. In other words, the transcription manager 106 may analyze the transcribed textual message 332, "Sorry, but I'm sunning a few minuets late" to include words that are all correctly spelled, but that do not make sense together as a sentence. Accordingly, in a preferred embodiment, the transcription manager 106 would determine the words that are most likely incorrect in the transcribed textual message 332 to be "sunning" and "minuets."

As shown in FIG. 3G, the user interface manager 102 may provide low-confidence indicators 336*a*, 336*b* that appear as lines under the words "sunning" and "minuets" in the transcribed textual message 332. In one or more alternative embodiments, the user interface manager 102 may provide low-confidence indicators that appear in different ways. For example, in an alternative embodiment, a low-confidence indicator may be a zigzag line under a word, a word displayed in a different color, a highlight over a word, or in any other manner suitable for this purpose.

In one or more embodiments, the user interface manager 102 may cause the low-confidence indicators 336*a*, 336*b* to be interactive. For example, as shown in FIG. 3G, the user input detector 104 may detect a touch gesture including the finger 314 of the user's hand tapping either of the low-confidence indicators 336*a*, 336*b*. In one or more alternative embodiments, the user input detector 104 may detect another type of touch gesture include the finger 314 and one of the low-confidence indicators 336*a*, 336*b*, such as a press-and-hold touch gesture, a swipe touch gesture, etc.

The transcription manager 106 may also provide one or more alternate suggestions for words in a transcription that are analyzed to be likely incorrect. For example, in one or more embodiments, when the transcription manager 106 determines that the word "sunning" is likely incorrect, as described above, the transcription manager 106 may also determine one or more alternate words to suggest as replacements for the word "sunning." In one or more embodiments, the user interface manager 102 may provide the one or more alternate words in order to assist in correcting a transcription.

In response to a detected selection of a low-confidence indicator, the user interface manager 102 may display the one or more alternate word suggestions to replace the word associated with the selected low-confidence indicator. For example, as shown in FIG. 3G, the user input detector 104 may detect an interaction of the finger 314 of the user's hand with the low-confidence indicator 336*a* associated with the word "sunning." In response to the detected selection of the low-confidence indicator 336*a*, and as illustrated in FIG. 3H, the user interface manager 102 may display alternate suggestions 338*a* ("stunning"), 338*b* ("running"), and 338*c* ("Other") to the word "sunning." As described above, the transcription manager 106 can provide the alternate suggestions 338*a* and 338*b* based on standard definitions, word indices, or a word lattice.

In one or more alternative embodiments, the user interface manager 102 provides the alternate suggestion 338*c* ("Other") not as a word replacement suggestion, but rather as a selectable control. For example, in an alternative embodiment, a detected selection of the alternate suggestion 338*c* would cause the user interface manager 102 to display a user interface allowing a user to specify a replacement word. For instance, in response to a detected selection of the alternate suggestion 338*c*, the user interface manager 102 may display a user interface including a text box and a touch screen display keyboard, wherein the transcription manager 106 may receive one or more words from a user that will replace the word associated with the low-confidence indicator 336*a* ("sunning").

As described above, the electronic communication 308*a'* includes the playback control 334 and the transcribed textual message 332. In one or more embodiments, the user interface manager 102 may cause the playback control 334 to play a portion of the detected sound recorded by the transcription manager 106 in response to a detected selection of a low-confidence indicator within the transcribed textual message 332. In a particular embodiment, the transcription manager 106 maps each word in a transcribed message to a timestamp within the recording of the detected sounds from which the transcribed message was made. For example, as shown in FIG. 3G, in response to a detected selection of the low-confidence indicator 336*a*, the playback control 334 may prepare to play the recorded message at a timestamp that is mapped to the transcribed word "sunning." In a particular embodiment, the playback control will then play the spoken word "running" from the recorded message at the timestamp mapped to the transcribed word "sunning," thus alerting a user as to the word that lead to the transcription of the word "sunning."

In one or more embodiments, the user interface manager 102 may provide an indication of where the low-confidence portions are in the recording associated with the playback control 334. For example, as illustrated in FIG. 3G, the user interface manager 102 can display low-confidence playback indicators 346*a* and 346*b* within the playback control 334. As described above, in one or more embodiments, the transcription manager 106 can map each word in the transcribed textual message 332 to a timestamp within the recording associated with the playback control 334. Accordingly, in a particular embodiment, the user interface manager 102 may place a low-confidence playback indicator within the playback control 334 at a location corresponding with the timestamp associated with a low-confidence word in the transcribed textual message 332.

For example, as shown in FIG. 3G, the user interface manager 102 can associate the low-confidence playback indicator 346*a* with the low-confidence word "sunning." Likewise, as shown in FIG. 3G, the user interface manager 102 can associated the low-confidence playback indicator 346*b* with the low-confidence word "minuets." In the embodiment shown, the user interface manager 102 can place the low-confidence playback indicators 346*a*, 346*b* at locations within the playback control 334 corresponding with the timestamps associated with the words "sunning" and "minuet."

In a particular embodiment, in response to a detected tap touch gesture with the low-confidence indicator 336*a*, the user interface manager 102 may position the play button 340 at the beginning of the low-confidence playback indicator 346*a*. Also, in one or more embodiments, in response to a detected tap touch gesture with the low-confidence indicator 336*a*, the playback control 334 may play the portion of the recording associated with the low-confidence playback indicator 346*a*, which consists of the spoken word "running." In one or more alternative embodiments, the user interface manager 102 displays the alternate suggestions 338*a*, 338*b*, and 338*c* (as shown in FIG. 3H) following the playback of the portion of the recording associated with the low-confidence playback indicator 346*a*.

The user interface manager 102 may replace a word associated with a low-confidence indicator with a selected alternate suggestion. For example, as shown in FIG. 3H, the user input detector 104 may detect a selection of the alternate suggestion 338b ("running") by the finger 314 of a user's hand. In response to the detected selection of the alternate suggestion 338b, in one or more embodiments, the user interface manager 102 may replace the word associated with the low-confidence indicator 336a ("sunning") with the selected alternate suggestion 338b. For example, as illustrated in FIG. 3I, the transcribed textual message 332 now reads, "Sorry, but I'm running a few minuets late."

FIGS. 3G and 3H illustrate the electronic communication system 100 providing editing/correction options after a message 308a' has already been sent. One will appreciate in light of the disclosure herein that the present invention is not so limited. For example, in alternative embodiments the electronic communication system 100 can provide the analysis of the transcription and the suggestions 338a-c prior to the message 308a being sent. Thus, the sender can correct the transcription of the message 308a' prior to sending the message 308a. In such embodiments rather then sending the message 308a' upon release of the sound recording control 318 (FIG. 3F), the electronic communication system 100 can send the electronic message 308a' upon the user selecting a send option.

It should be noted that the electronic communication 308a', as shown in FIGS. 3G-3H, is not only added to the communication thread 306 by the user interface manager 102, but is also sent to one or more co-users by the communication manager 108. For example, FIG. 3I illustrates a computing device 300a to which the electronic message 308a' was sent. As shown by FIG. 3I upon receiving the electronic message 308a', the user interface manager 102 can add the electronic communication 308a' to the communication thread 306' as received electronic message 308b'. In one or more embodiments, the electronic communication 308b' includes the recorded message and a transcription of the recorded message. For example, as shown in FIG. 3I, electronic communication 308b' may include a playback control 334'. In one or more embodiments, the playback control 334' further includes other control elements such as a play button 340' and a length indicator 342'. In a preferred embodiment, when user input detector 104 detects an interaction with the play button 340' of the playback control 334', the recorded message associated with the electronic communication 308b' may be played through a speaker associated with the computing device 300a.

Furthermore, when originally received by the computing device 300a the user interface manager 102 can display the original message (i.e., "Sorry, but I'm sunning a few minuets late"). After the user corrects the transcribed textual message 332, as shown in FIG. 3H, the computing device 300 can send an update including the correction to the computing device 300a. Upon receiving the update including the correction, the user interface manager 102 can update the electronic communication 300b' to include the corrected transcribed textual message 332', "Sorry, but I'm running a few minuets late," as shown in FIG. 3I. In this way, any corrections made to the electronic communication 308a' by the user may be propagated out the one or more co-users who have received the electronic communication 308b'.

For example, the corrected transcribed textual message 332' may be displayed on a computing device 300a associated with a message recipient. As illustrated in FIG. 3I, the user interface manager 102 displays the electronic communication 308b' within the messaging graphical user interface 304' of the recipient's computing device 300a including the transcribed textual message 332' and the playback control 334'. In one or more embodiments, the user interface manager 102 displays the display elements 304', 306', 308a'', 334', and 332' within the messaging graphical user interface 304' such that they mirror the display elements 304, 306, 308a', 334, and 332 displayed in FIG. 3H. As described above, the communication manager 108 propagates any corrections out to the one or more co-users. Accordingly, the user interface manager 102 updates the communication thread 306' to include the correction changing "sunning" to "running", in the transcribed textual message 332' of FIG. 3I, which reads, "Sorry, but I'm running a few minuets late."

Additionally, in one or more embodiments, in response to the correction demonstrated with regard to FIG. 3G, the user interface manager 102 may display the low-confidence playback indicator 346b' within the playback control 334'. For example, as shown in FIG. 3I, the user interface manager 102 can place the low-confidence playback indicator 346b' at a location within the playback control 334' corresponding with the timestamp associated with the word "minuet" in the transcribed textual message 332'. As the correction for the word "sunning" has already been made (see FIG. 3G), the user interface manager 102 no longer displays the low-confidence playback indicator 346a within the playback control 334'.

In one or more embodiments, a recipient utilizing the computing device 300a may desire to make further corrections to the transcribed textual message 332'. For example, as illustrated in FIG. 3I, the user interface manager 102 can display the indicator 336b under the word "minuets." As described above, in one or more embodiments, the indicator 336b indicates the transcription manager 106 has analyzed the word "minuet" to likely be incorrect. As described above, in one or more embodiments, the indicator 336b may be interactive. Accordingly, the user interface manager 102 may display alternate suggestions 338d ("minutes") and 338e ("Other") in response to a detected selection of indicator 336b by the recipient's finger 314'.

In one or more embodiments, a recipient may correct the transcribed textual message 332' in a process similar to that described above. For example, in response to the user interface manager 102 displaying alternate suggestions 338d, and 338e, a recipient may select alternate suggestion 338d ("minutes"). In one or more embodiments, in response to the detected selection of the alternate suggestion 338d, the user interface manager 102 may substitute the word associated with the indicator 336b ("minuets") with the selected alternate suggestion ("minutes").

Furthermore, in one or more embodiments, the communication manager 108 may propagate corrections originating from the computing device 300a associated with the message recipient (as illustrated in FIG. 3I) back to the computing device 300 associated with the message sender. For example, in response to the selected substitution illustrated in FIG. 3I, the user interface manager 102 can send an update with the correction to the transcribed textual message 332' to the computing device 300. Upon receiving the update, the user interface manager 302 at the computing device 300 can update the transcribed textual message 332 as illustrated in FIG. 3J, to include the correction. Thus, the corrected transcribed textual message 332 displayed within the communication thread 306 and included in electronic communication 308a' includes the corrected message, "Sorry, but I'm running a few minutes late." As described above, this corrected transcribed textual message 332 matches the words spoken by the user and included in the recorded message. Accordingly, in one or more embodiments, message sender and the message recipient may both make corrections to the transcribed textual message 332. Furthermore, any corrections or changes can be made both at the device at which the corrections or changes are made and any other devices associated with a sender or a recipient of the message 308.

Figure 3K:
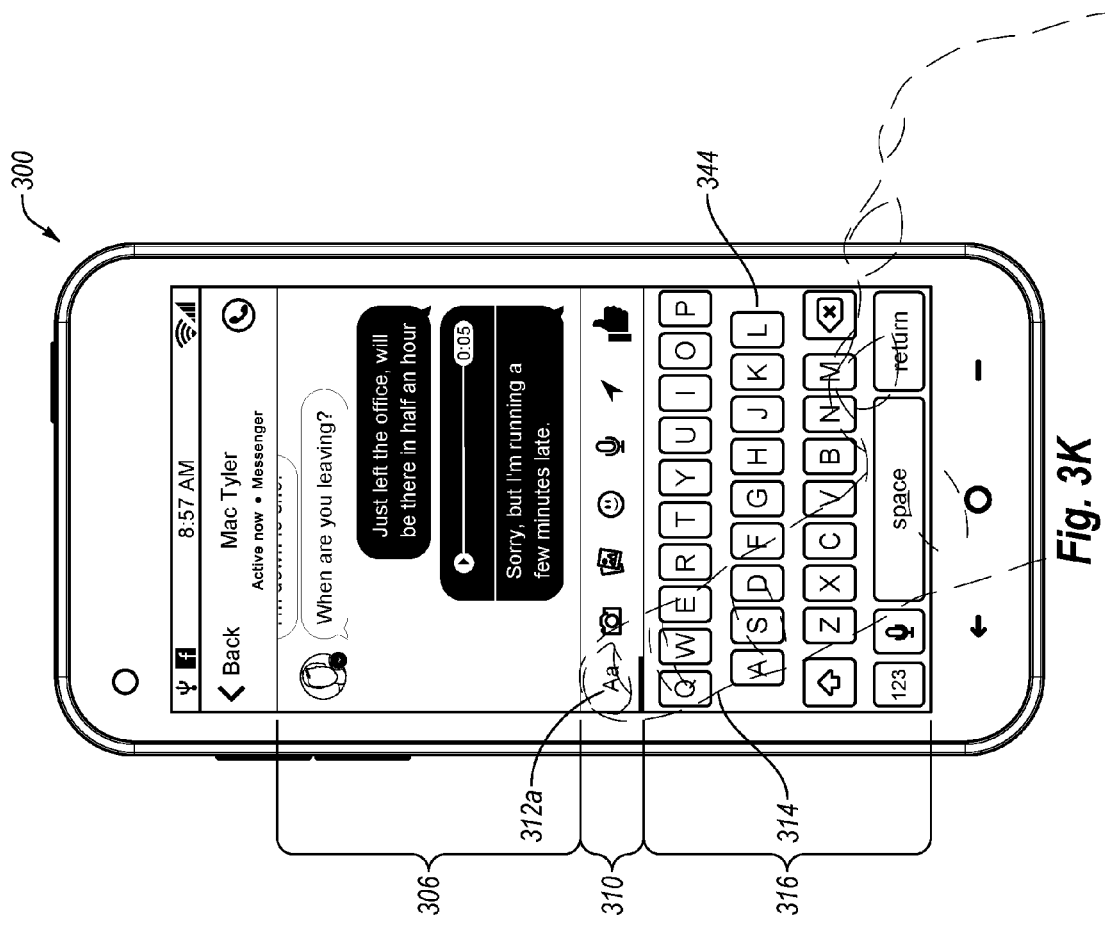

The user interface manager 102 may also update the message input control area 316 in response to a detected selection of an input control from the message input controls palette 310. For example, as illustrated in FIGS. 3J and 3K, in response to a detected selection of the text input control 312a by the finger 314 of the user in FIG. 3K, the user interface manager 102 replaces the sound recording control 318 (shown in FIG. 3J) within the message input control area 316 with a touch screen display keyboard 344. In one or more alternative embodiments, the user interface manager 102 may update the message input control area 316 in response to a selection of any of the input controls within the message input controls palette 310, as described above. Alternatively, the user interface manager 102 may also remove the message input control area 316 in response to a detected touch gesture.

Figure 4:
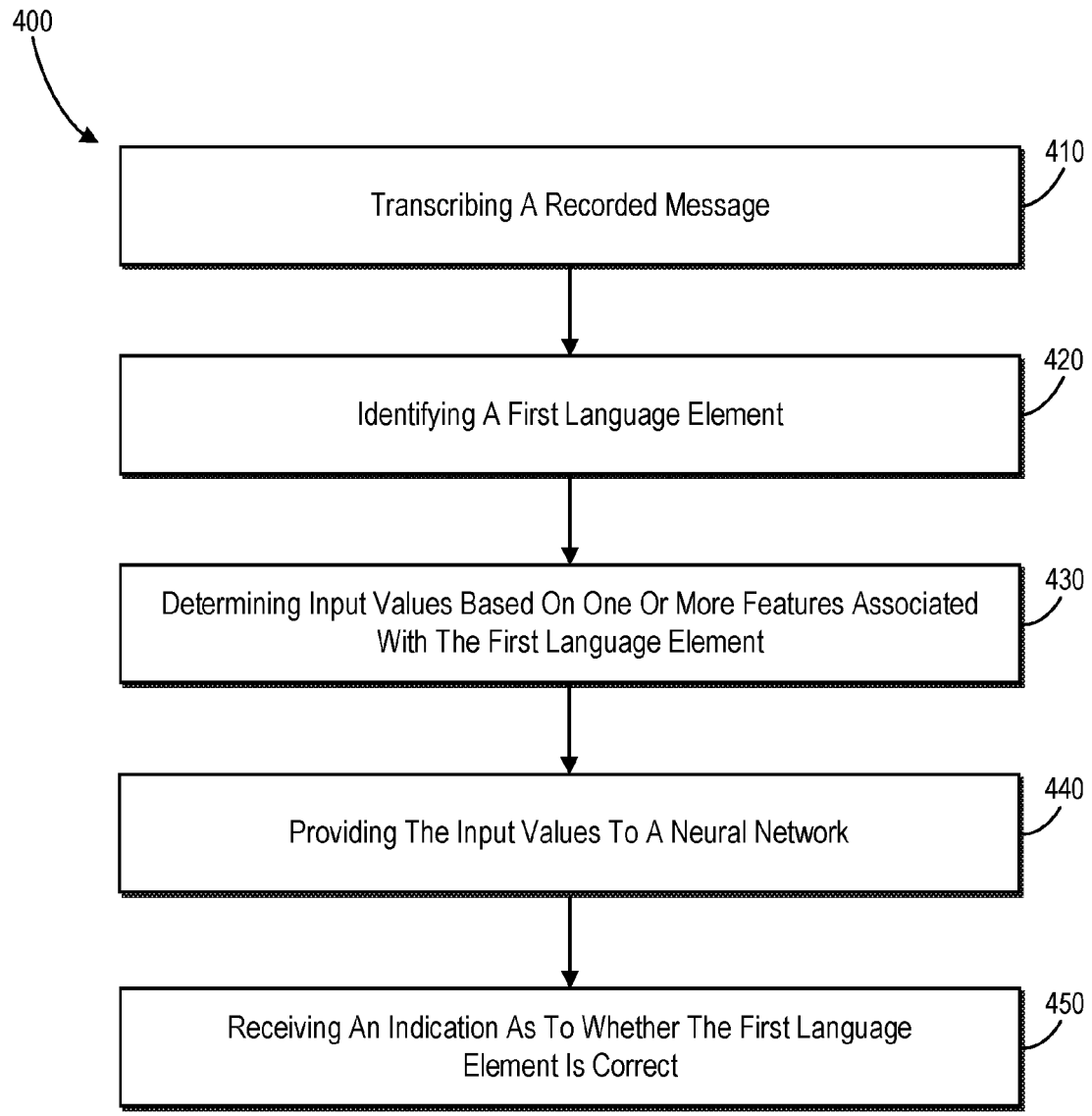
FIG. 4 illustrates a flowchart of a series of acts in a method of determining a confidence score associated with a transcription in accordance with one or more embodiments.
Figure 5:
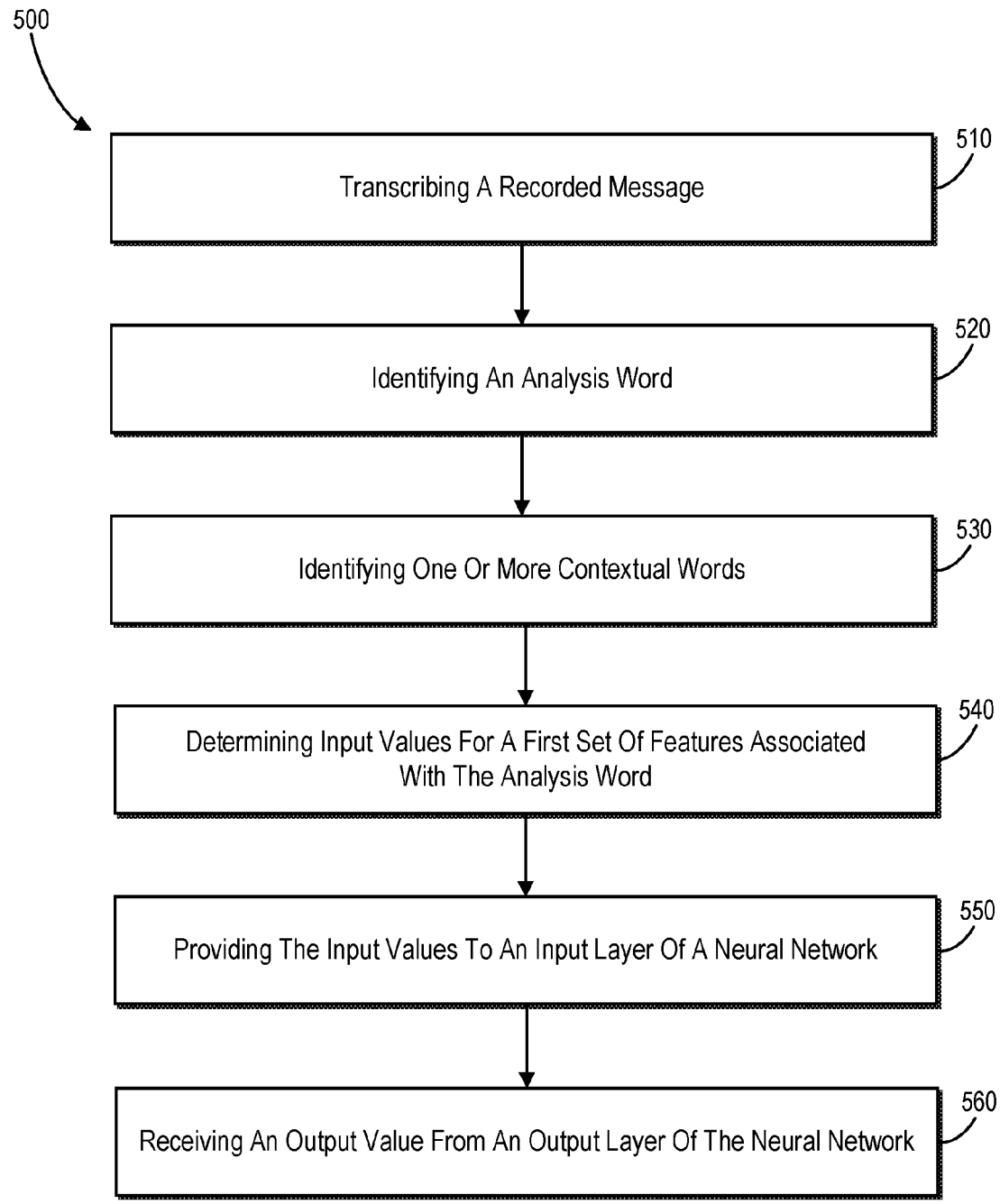
FIG. 5 illustrates a flowchart of a series of acts in another method of determining a confidence score associated with a transcription in accordance with one or more embodiments.

FIGS. 1-3K, the corresponding text, and the examples, provide a number of different systems and devices for creating a transcribed electronic communication based on a sound input via a graphical user interface of a communication system. In addition to the foregoing, embodiments of the present invention can also be described in terms of flowcharts comprising acts and steps in a method for accomplishing a particular result. For example, FIGS. 4 and 5 illustrate flowcharts of exemplary methods in accordance with one or more embodiments of the present invention. The methods described in relation to FIGS. 4 and 5 may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of one example method 400 of determining a confidence score associated with a transcription. The method 400 includes an act 410 of transcribing a recorded message. In particular, the act 410 can involve transcribing a recorded message into a textual message having a plurality of language elements. In one or more embodiments, transcribing a recorded message into a textual message further includes building a word lattice comprising the textual message as well as alternative textual messages.

The method 400 further includes an act 420 of identifying a first language element. In particular, the act 420 can involve identifying a first language element from among the plurality of language elements of the textual message. For example, in one or more embodiments, the first language element is an analysis word upon which a transcription confidence score is based.

The method 400 also includes an act 430 of determining input values based on one or more features associated with the first language element. In particular, the act 430 can involve, determining, by the at least one processor, input values based on one or more features associated with the first language element, and one or more features associated with one or more additional language elements of the textual message. For example, the method 400 can also include an act of identifying information related to the textual message and the first language element, wherein identifying information related to the textual message and the first language element comprises identifying sound inputs that make up the recorded message from which the textual message was transcribed. Additionally, the method 400 can include an act of identifying an a-posteriori confidence level related to the first language element, wherein identifying the a-posteriori confidence level includes determining whether the first language element is correct based on acoustic and language models. Thus, in at least one embodiment, one or more features associated with the first language element, and associated with one or more additional language elements of the textual message include one or more of features related to the textual message, features related to the first language element, features related to the identified sound inputs, features related to the a-posteriori confidence level, and features related to the word lattice. Furthermore, the method 400 can include an act 440 of providing the input values to a neural network. In particular, the act 440 involves providing the input values to an input layer of a neural network.

Additionally, in one or more embodiments, features related to the textual message include one or more of a logarithmic value based on the length of the textual message containing the first language element, the relative position of the first language element within the textual message, a logarithmic value associated with how well the first language element and three words preceding the analysis word in the textual message fit a language model, and a logarithmic value associated with a how well a unigram related to the textual message fits a language model. Furthermore, features related to the first language element include a logarithmic value based on the length of the first language element, and a number of times the first language element was incorrectly transcribed in an identified training set. Features related to the sound inputs include one or more of a duration of the sound inputs corresponding to the first language element, a logarithmic value associated with how well the sound inputs corresponding to the first language element match an acoustic model, a determination of energy within the sound inputs, a determination of a zero-crossing rate associated with the sound inputs, a number of frames in the sound inputs between the first language element and a most previous non-filler language element, a number of frames in the sound inputs between the first language element and a next non-filler language element, a standard deviation of the signal magnitude of the sound inputs over the first language element, and a ratio of the mean of the signal magnitude of the sound inputs corresponding to the first language element and the standard deviation of the signal magnitude of the sound inputs corresponding to the first language element. Also, features related to the a-posteriori confidence level include a mean of the a-posteriori confidence levels related to the plurality of digital representations of one or more spoken words in the recorded message. Additionally, features related to the word lattice include one or more of a percentage of occurrences of the first language element in the N-best list, and a sum of logarithmic probabilities of the sentences from the word lattice that are in the N-best list, divided by the size of the N-best list.

The method 400 also includes an act 450 of receiving an indication as to whether the first language element is correct. In particular, the act 450 can involve receiving, as an output of the neural network, an indication of whether the first language element of the transcribed textual message is correct. In one or more embodiments, the method 400 can include providing, based on the determination, an indication of whether the first language element is correctly transcribed.

FIG. 5 illustrates a flowchart of a method 500 of determining a confidence score associated with a transcription. The method 500 includes an act 510 of transcribing a recorded message. In particular, the act 510 can involve transcribing a recorded message into a textual message comprising a sentence with a plurality of words.

The method 500 also includes an act 520 of identifying an analysis word. In particular, the act 520 can involve identifying an analysis word from among the plurality of words of the sentence. Furthermore, the method 500 includes an act 530 of identifying one or more contextual words. In particular, the act 530 can involve identifying one or more contextual words associated with the analysis word. For example, identifying one or more contextual words associated with the analysis word comprises identifying the two words preceding the analysis word and identifying the two words following the analysis word.

Furthermore, the method 500 includes an act 540 of determining input values for a first set of features associated with the analysis word. In particular, the act 540 can involve determining input values for a first set of features associated with the analysis word, and a second set of features associated with the one or more contextual words. In one or more embodiments, the first set of features associated with the analysis word comprises nineteen features associated with the analysis word and the second set of features associated with the one or more contextual words comprises nineteen features associated with nearest word preceding the analysis word, nineteen features associated with the second nearest word preceding the analysis word, nineteen features associated with the nearest word following the analysis word, and nineteen features associated with the second nearest word following the analysis word. Additionally, in at least one embodiment, the method 500 can include identifying an a-posteriori confidence level related to the analysis word, wherein identifying the a-posteriori confidence level comprises determining whether the analysis word is correct based on acoustic and language models.

The method 500 includes an act 550 of providing the input values to an input layer of a neural network. In particular, the act 550 can involve providing the input values to an input layer of a neural network, wherein the input layer has a plurality of neurons based on a total number of features in the first set of features, and the second set of features. In one or more embodiments, the method 500 can include, prior to receiving an output value from an output layer of the neural network, building a first hidden layer and a second hidden layer, wherein the first hidden layer comprises a plurality of neurons, wherein each of the plurality of neurons in the first hidden layer is connected to each of the plurality of neurons in the input layer via one or more edges, and the second hidden layer comprises a plurality of neurons, wherein each of the plurality of neurons in the second hidden layer is connected to each of the plurality of neurons in the first hidden layer via one or more edges, and wherein the output layer comprises a single neuron connected via one or more edges to each of the plurality of neurons in the second hidden layer. Furthermore, in one or more embodiments, the plurality of neurons in the input layer comprises ninety five neurons, wherein each neuron is associated with an extracted feature based on the analysis word or the one or more contextual words, the plurality of neurons in the first hidden layer comprises one hundred and twenty eight neurons, and the plurality of neurons in the second hidden layer comprises one hundred and twenty eight neurons.

Finally, the method 500 includes an act 560 of receiving an output value from an output layer of the neural network. In particular, the act 560 can involve receiving an output value from an output layer of the neural network, wherein the output value indicates whether the analysis word is correct. In one or more embodiments, the method 500 further includes providing, based on the determination, an indication of whether the analysis word is correct.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
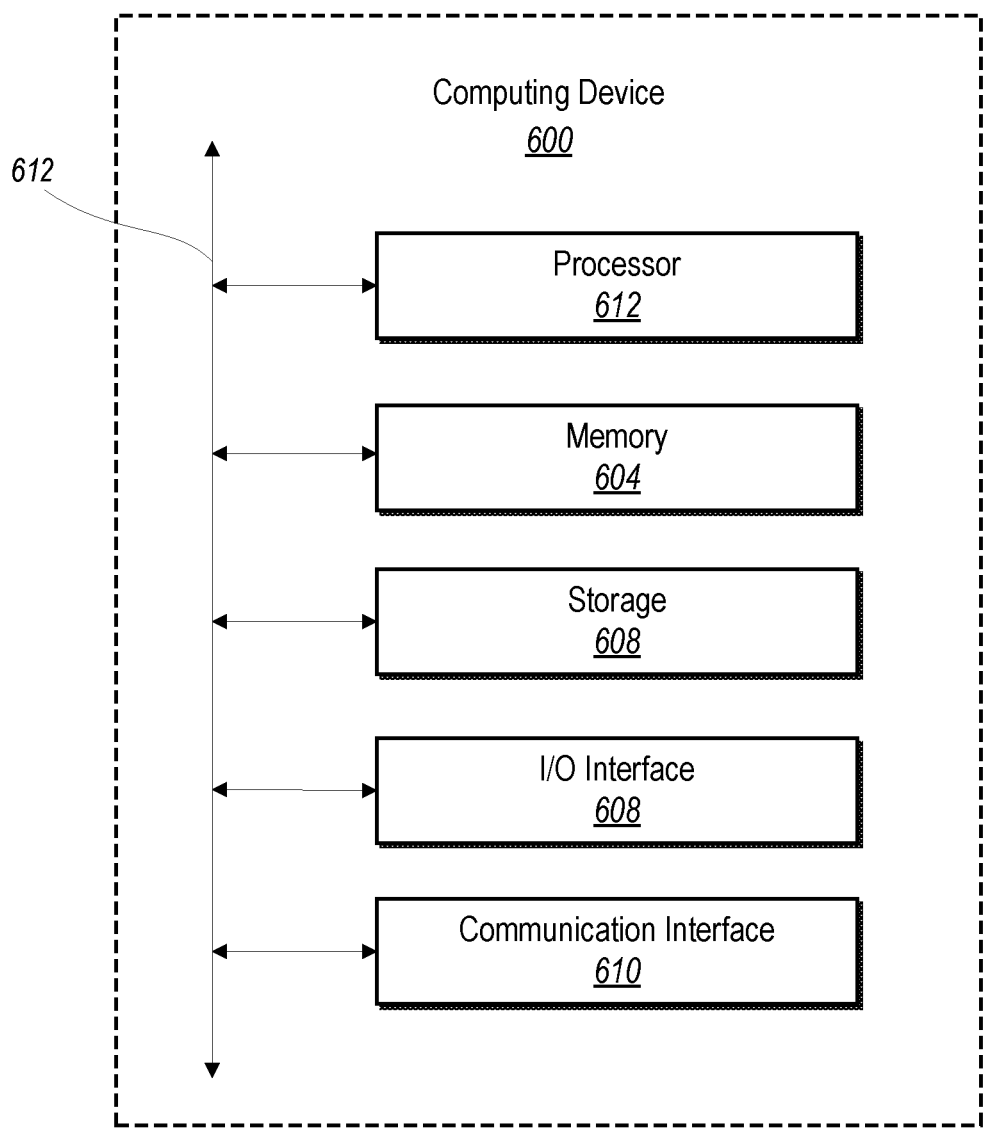
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the electronic communication system 100. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In particular embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the network 206 and/or communication server 208 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 7:
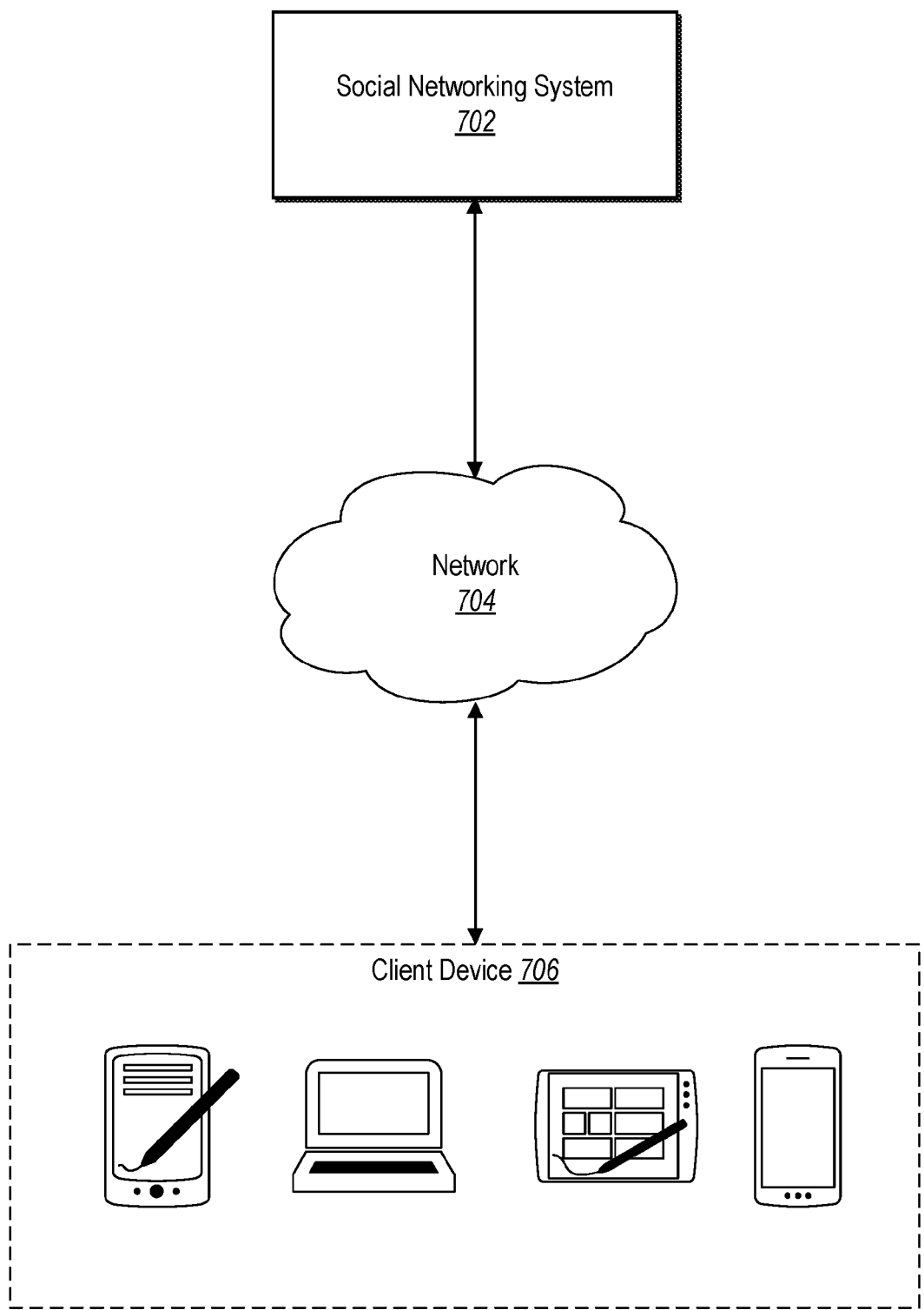
FIG. 7 is an example network environment of a social networking system in accordance with one or more embodiments.

FIG. 7 illustrates an example network environment of a social-networking system. In particular embodiments, a social-networking system 702 may comprise one or more data stores. In particular embodiments, the social-networking system 702 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 702 may comprise one or more computing devices (e.g., servers) hosting functionality directed to operation of the social-networking system. A user of the social-networking system 702 may access the social-networking system 702 using a client device such as client device 706. In particular embodiments, the client device 706 can interact with the social-networking system 702 through a network 704.

The client device 706 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 706 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 704.

Network 704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 706 may access the social-networking system 702.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for providing a textual transcription of a sound recording comprising:
   transcribing, by at least one processor, a recorded message into a textual message having a plurality of language elements;
   identifying a first language element from among the plurality of language elements of the textual message;
   determining, by the at least one processor, input values based on one or more features associated with the first language element and based on one or more features associated with additional language elements of the textual message;
   identifying a-posteriori confidence levels for the first language element and each additional language element of the additional language elements;
   providing the input values and the a-posteriori confidence levels to an input layer of a neural network;
   receiving, as an output of the neural network, an indication of whether the first language element of the transcribed textual message is correct; and
   based on the indication of whether the first language element of the transcribed textual message is correct, associating a confidence indicator with the first language element of the transcribed textual message.

2. The method as recited in claim 1, wherein transcribing a recorded message into a textual message further comprises building a word lattice comprising the textual message as well as alternative textual messages related to the plurality of language elements.

3. The method as recited in claim 2, wherein identifying the a-posteriori confidence levels comprises determining the a-posteriori confidence levels based on an acoustic model and a language model.

4. The method as recited in claim 3, further comprising identifying sound inputs from the recorded message that correspond to each of the textual message, the first language element, and the additional language elements.

5. The method as recited in claim 4, wherein the one or more features associated with the first language element and the one or more features associated with the additional language elements comprise features related to the textual message, features related to the first language element, features related to the additional language elements, features related to the sound inputs, features related to the a-posteriori confidence levels, and features related to the word lattice.

6. The method as recited in claim 5, wherein features related to the textual message comprise:
 a logarithmic value based on a length of the textual message containing the first language element and the additional language elements,
 a relative position of the first language element and the additional language elements within the textual message,
 a logarithmic value representing a comparison of the first language element and the additional language elements to a language model, and
 a logarithmic value representing a comparison of a unigram related to the textual message and the additional language elements to the language model.

7. The method as recited in claim 5, wherein features related to the first language element and the additional language elements comprises a logarithmic value based on a length of the first language element and the additional language elements, and a number of times the first language element and the additional language elements were incorrectly transcribed in an identified training set.

8. The method as recited in claim 5, wherein features related to the sound inputs comprises one or more of a duration of the sound inputs corresponding to the first language element and the additional language elements.

9. The method as recited in claim 8, wherein features related to the sound inputs further comprise:
 a determination of a zero-crossing rate associated with the sound inputs,
 a number of frames in the sound inputs between the first language element and the additional language elements and a most previous non-filler language element, and
 a number of frames in the sound inputs between the first language element and the one or more additional language elements and a next non-filler language element.

10. The method as recited in claim 9, wherein the features related to the sound inputs further comprise:
 a logarithmic value representing a comparison of the sound inputs corresponding to the first language element and the additional language elements to an acoustic model,
 a determination of energy within the sound inputs,
 a standard deviation of a signal magnitude of the sound inputs over the first language element and the additional language elements, and
 a ratio of a mean of the signal magnitude of the sound inputs corresponding to the first language element and the additional language elements and the standard deviation of the signal magnitude of the sound inputs corresponding to the first language element and the additional language elements.

11. The method as recited in claim 5, wherein the features related to the a-posteriori confidence levels comprise a mean of the a-posteriori confidence levels.

12. The method as recited in claim 5, wherein the features related to the word lattice comprise one or more of a percentage of occurrences of the first language element and the additional language elements in an N-best list, and a sum of logarithmic probabilities of the textual message as well as the alternative textual messages from the word lattice that are in the N-best list, divided by a size of the N-best list.

13. A method for providing a textual transcription of a sound recording comprising:
 transcribing, by at least one processor, a recorded message into a textual message comprising a sentence with a plurality of words;
 identifying an analysis word from among the plurality of words of the sentence;
 identifying one or more contextual words associated with the analysis word;
 identifying a-posteriori confidence levels for the analysis word and the one or more contextual words associated with the analysis word;
 determining, by the at least one processor, input values for a first set of features associated with the analysis word, and a second set of features associated with the one or more contextual words;
 providing the input values and the a-posteriori confidence levels to an input layer of a neural network, wherein the input layer has a plurality of neurons based on a total number of features in the first set of features and the second set of features;
 receiving an output value from an output layer of the neural network, wherein the output value indicates whether the analysis word is correct; and
 based on the output value, associating a confidence indicator with the analysis word in the textual message.

14. The method as recited in claim 13, wherein the one or more contextual words associated with the analysis word comprises two words preceding the analysis word and two words following the analysis word.

15. The method as recited in claim 14, further comprising, prior to receiving the output value from the output layer of the neural network, building a first hidden layer and a second hidden layer, wherein:
 the first hidden layer comprises a plurality of neurons, wherein each of the plurality of neurons in the first hidden layer is connected to each of the plurality of neurons in the input layer via one or more edges, and
 the second hidden layer comprises a plurality of neurons, wherein each of the plurality of neurons in the second hidden layer is connected to each of the plurality of neurons in the first hidden layer via one or more edges, and
 wherein the output layer comprises a single neuron connected via one or more edges to each of the plurality of neurons in the second hidden layer.

16. The method as recited in claim 15, wherein:
 the plurality of neurons in the input layer comprises ninety five neurons, wherein each neuron is associated with an extracted feature based on the analysis word or the one or more contextual words, the plurality of neurons in the first hidden layer comprises one hundred and twenty eight neurons, and the plurality of neurons in the second hidden layer comprises one hundred and twenty eight neurons.

17. The method as recited in claim 16, wherein identifying a-posteriori confidence levels comprises determining whether the analysis word and the one or more contextual words are correct based on an acoustic model and a language model.

18. The method as recited in claim 17, wherein:

the first set of features associated with the analysis word comprises nineteen features associated with the analysis word; and the second set of features associated with the one or more contextual words comprises nineteen features associated with a nearest word preceding the analysis word, nineteen features associated with a second nearest word preceding the analysis word, nineteen features associated with the nearest word following the analysis word, and nineteen features associated with the second nearest word following the analysis word.

19. A system for providing a textual transcription of a sound recording comprising:

at least one processor;

at least one non-transitory computer readable storage medium storing instructions thereon that, when executed by the at least one processor, cause the system to:

transcribe a recorded message into a textual message comprising a sentence with a plurality of words;

identify an analysis word from among the plurality of words of the sentence;

identify one or more contextual words associated with the analysis word;

identify a-posteriori confidence levels for the analysis word and the one or more contextual words associated with the analysis word;

determine input values for a first set of features associated with the analysis word and a second set of features associated with the one or more contextual words;

provide the input values and the a-posteriori confidence levels to an input layer of a neural network, wherein the input layer has a plurality of neurons based on a total number of features in the first set of features and the second set of features;

receive an output value from an output layer of the neural network, wherein the output value indicates whether the analysis word is correct; and based on the output value, associate a confidence indicator with the analysis word in the textual message.

20. The system as recited in claim 19, wherein the at least one non-transitory computer readable storage medium further stores instructions that, when executed by the at least one processor, cause the system to:

provide a first hidden layer comprising one hundred and twenty eight neurons, wherein the plurality of neurons in the input layer comprises ninety five neurons, and each of the one hundred and twenty eight neurons in the first hidden layer is connected to each of the ninety five neurons in the input layer via one or more edges;

provide a second hidden layer comprising one hundred and twenty eight neurons, wherein each of the one hundred and twenty eight neurons in the second hidden layer is connected to each of the one hundred and twenty eight neurons in the first hidden layer via one or more edges; and wherein the output layer comprises a single neuron, and the single neuron of the output layer is connected to each of the one hundred and twenty eight neurons in the second hidden layer via one or more edges.

* * * * *